United States Patent [19]
Wright et al.

[11] Patent Number: 5,570,691
[45] Date of Patent: *Nov. 5, 1996

[54] METHOD AND APPARATUS FOR REAL-TIME, CONCURRENT ADAPTIVE FOCUSING IN AN ULTRASOUND BEAMFORMER IMAGING SYSTEM

[75] Inventors: J. Nelson Wright, Menlo Park; Samuel H. Maslak, Woodside; Donald R. Langdon; Gregory L. Holley, both of Mountain View; Christopher R. Cole, Cupertino, all of Calif.

[73] Assignee: Acuson Corporation, Mountain View, Calif.

[ * ] Notice: The term of this patent shall not extend beyond the expiration date of Pat. No. 5,551,433.

[21] Appl. No.: 286,528

[22] Filed: Aug. 5, 1994

[51] Int. Cl.$^6$ ........................................ A61B 8/00
[52] U.S. Cl. ........................ 128/661.01; 73/626
[58] Field of Search .................. 128/660.01, 660.06, 128/660.07, 661.01; 364/413.25; 73/626; 367/7, 11

[56] References Cited

U.S. PATENT DOCUMENTS

| | | | |
|---|---|---|---|
| 4,395,909 | 8/1983 | Steinberg et al. | 73/602 |
| 4,397,006 | 8/1983 | Galbraith, Jr. | 367/40 |
| 4,471,785 | 9/1984 | Wilson et al. | 128/660 |
| 4,592,237 | 6/1986 | Ogura et al. | 73/602 |
| 4,653,505 | 3/1987 | Iinuma | 128/660 |
| 4,699,009 | 10/1987 | Maslak et al. | 73/626 |
| 4,817,614 | 4/1989 | Hassler et al. | 128/660.05 |
| 4,835,689 | 5/1989 | O'Donnell | 364/413.25 |
| 4,852,577 | 8/1989 | Smith et al. | 128/660.07 |
| 4,937,775 | 6/1990 | Engeler et al. | 364/728.03 |
| 4,989,143 | 1/1991 | O'Donnell et al. | 364/413.25 |
| 5,113,866 | 5/1992 | Hassler et al. | 128/661.01 |
| 5,172,343 | 12/1992 | O'Donnell | 367/7 |
| 5,184,623 | 2/1993 | Mallart | 128/661.01 |
| 5,203,336 | 4/1993 | Iida et al. | 128/660.06 |
| 5,235,983 | 8/1993 | Iida et al. | 128/660.06 X |
| 5,268,876 | 12/1993 | Rachliu | 128/661.01 X |
| 5,331,963 | 7/1994 | Mallart | 128/661.01 |
| 5,331,964 | 7/1994 | Trahey et al. | 128/661.01 |

(List continued on next page.)

FOREIGN PATENT DOCUMENTS

| | | | |
|---|---|---|---|
| 3926477 | 2/1991 | Germany | G03B 42/06 |

OTHER PUBLICATIONS

Kiuo, G. S. "Acoustic Waves: Device, Iwosing, and Analog Signal Processing", Prentice Hall Inc., © 1987 pp. 262–275.

D. Liu & R. Waag, Correction of Ultrasonic Wavefront Distortion Using Backpropagation and a Reference Waveform Method for Time–Shift Compensation, J. Acoust. Soc. Am., 95(2), Pt. 1, pp. 649–660 (Aug. 1994).

*Phase Aberration Correction in Medical Ultrasound Using Speckle Brightness as a Quality Factor*, Levin Nock, Gregg E. Trahey and Stephen W. Smith, Journal of Acoustical Society of America, vol. 85, No. 5, May 1989.

*Real–Time Correction of Atmospherically Degraded Telescopic Images Through Image Sharpening*, Richard A. Muller and Andrew Buffington, Journal of the Optical Society of America, vol. 64, Sep. 1974.

*Direct Estimation of Aberrating Delays in Pulse–Echo Imaging Sytems*, D. Rachlin, Journal of the Acoustical Society of America, vol. 88, Jul. 1980.

(List continued on next page.)

Primary Examiner—Francis Jaworski
Attorney, Agent, or Firm—Brinks Hofer Gilson & Lione

[57] ABSTRACT

A method and an apparatus are provided for dynamic, real-time adaptive focusing for ultrasound imaging. Aberration delay correction values, corresponding to an aberration region in an imaged subject, are measured concurrently during B-mode imaging scan lines and updated at the scan line rate. The measured aberration delay correction values are then applied concurrently to correct the focus of all transmitted and received ultrasound scan lines, regardless of the imaging mode, scan geometry, or imaging frequencies.

47 Claims, 11 Drawing Sheets

U.S. PATENT DOCUMENTS

| | | | |
|---|---|---|---|
| 5,348,013 | 9/1994 | Kanda et al. | 128/661.01 |
| 5,353,797 | 10/1994 | Matsushima et al. | 128/660.07 |
| 5,357,962 | 10/1994 | Green | 128/660.07 |
| 5,369,450 | 11/1994 | Haseltine et al. | 348/745 |
| 5,388,461 | 2/1995 | Rigby | 128/661.01 |
| 5,415,173 | 5/1995 | Miwa et al. | 128/661.01 |
| 5,423,318 | 6/1995 | Li et al. | 128/661.01 |
| 5,460,180 | 10/1995 | Klepper et al. | 128/661.01 |
| 5,487,306 | 1/1996 | Fortes | 73/547 |

OTHER PUBLICATIONS

*Adaptive Ultrasonic Array Imaging System Through and Inhomogeneous Layer*, Makoto Hirama, Osamu Ikeda and Takuso Sato, *Journal of the Acoustical Society of America*, vol. 71, Jan. 1982.

*Active Incoherent Ultrasonic Imaging Through and Inhomogeneous Layer*, Takayoshi Yokota, Takuso Sato, and Makoto Hirama, *Journal of the Acoustical Society of America*, vol. 77, Jan. 1985.

*Phase Aberration Correction Using Signals from Point Reflectors and Diffuse Scatterers*, S. W. Flax and M. O'Donnell, *IEEE Transactions on Ultrasonics, Ferroelectrics, and Frequency Control*, vol. 35, Nov. 1988.

*Self–Cohering Large Antenna Arrays Using the Spatial Correlation Property of Radar Clutter*, E. Hasham Attia and Bernald D. Steinberg, *IEEE Transactions on Antennas and Propagation*, vol. 37, Jan. 1989.

Bernard Steinberg, *Microwave Imaging Techniques*, Chapters 8–9, John Wiley & Sons, 1991.

*Correlation–Based Aberration Correction in the Presence of Inoperative Elements*, Matthew O'Donnell and William E. Engeler, *IEEE Transactions of Ultrasonics, Ferroelectrics, and Frequency Control*, vol. 39, Nov. 1992.

*A Discussion of Two Wavefront Abberation Correction Procedures*, Bernard Steinberg, *Ultrasonic Imaging*, vol. 14, 1992.

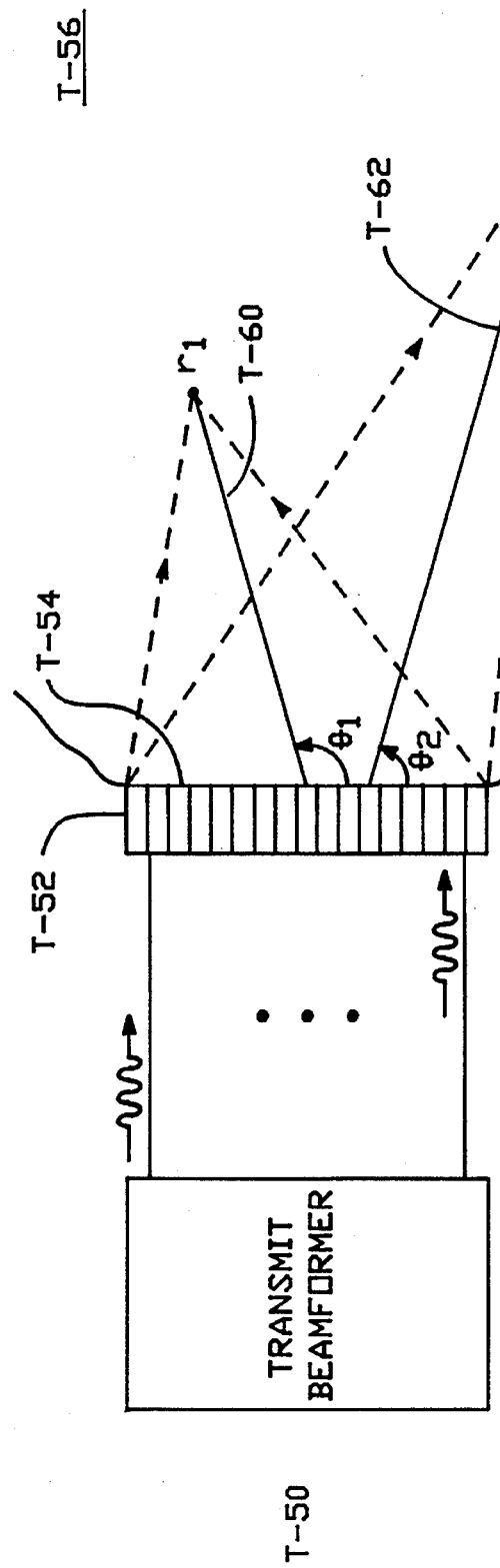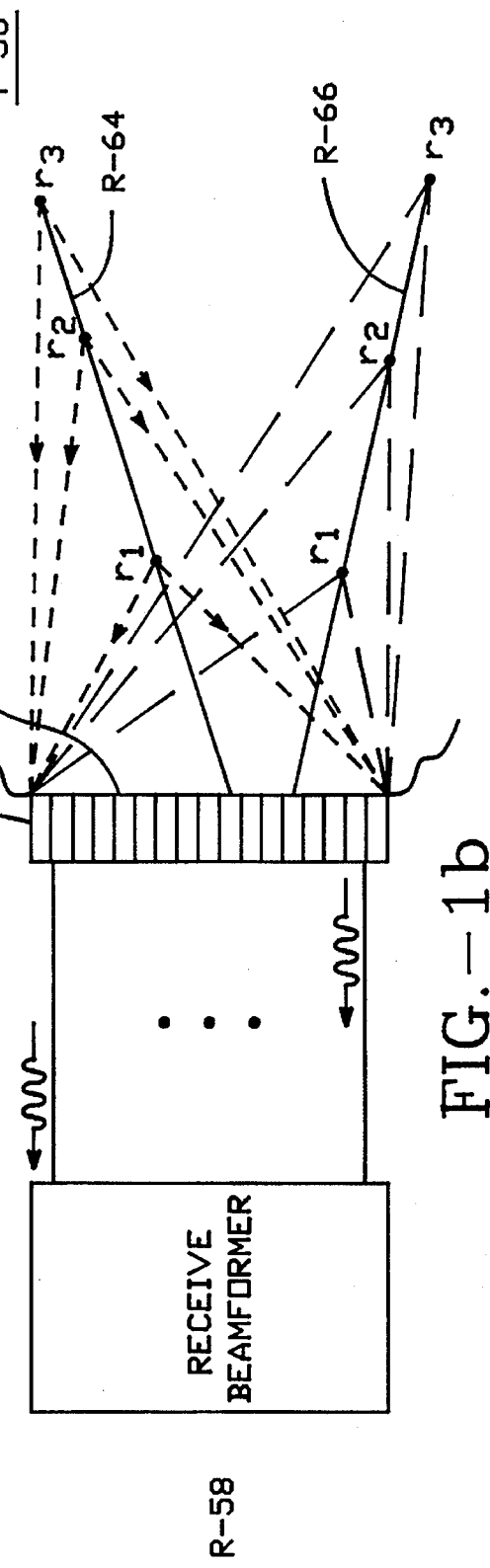

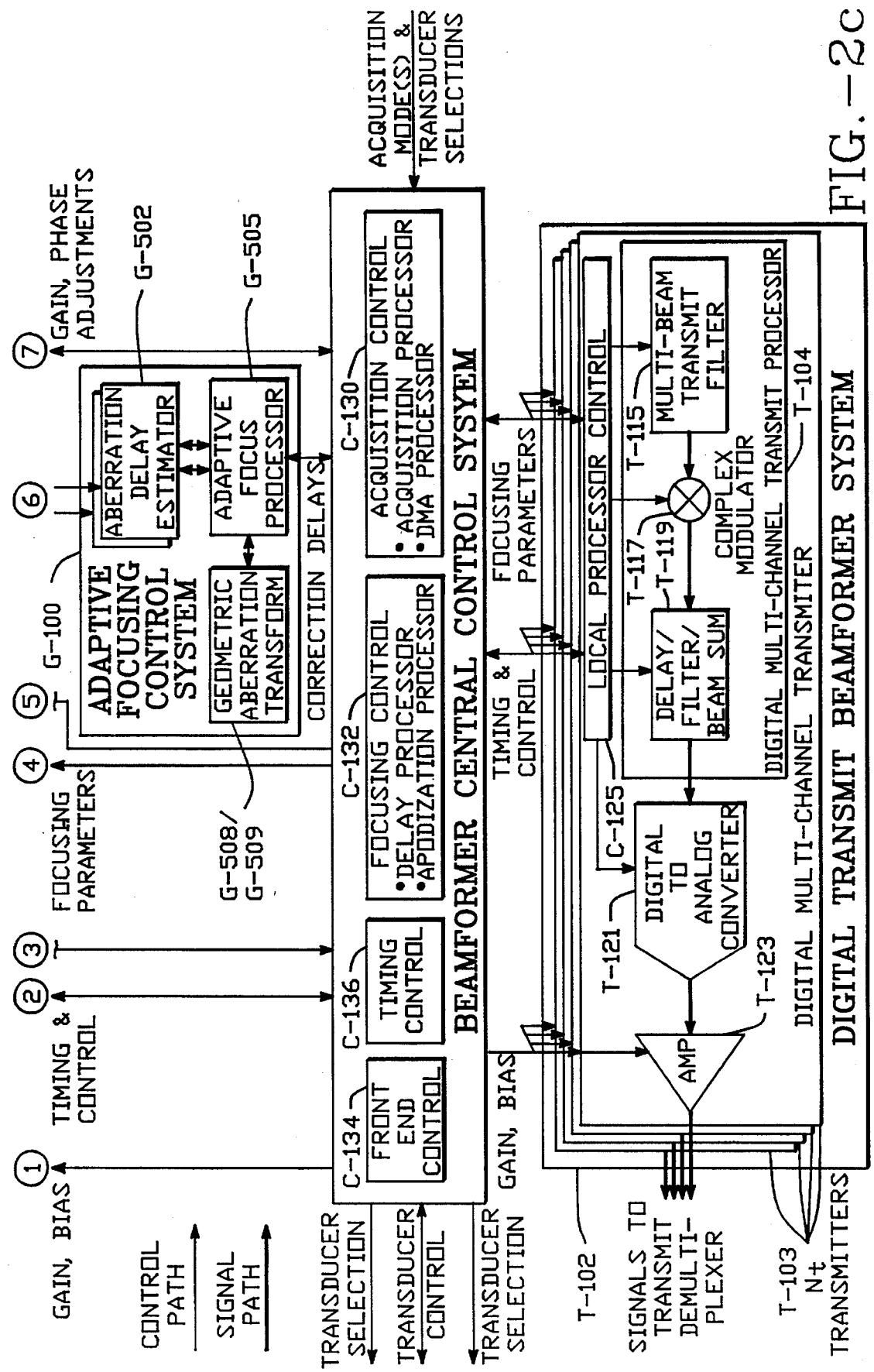

FIG. — 4

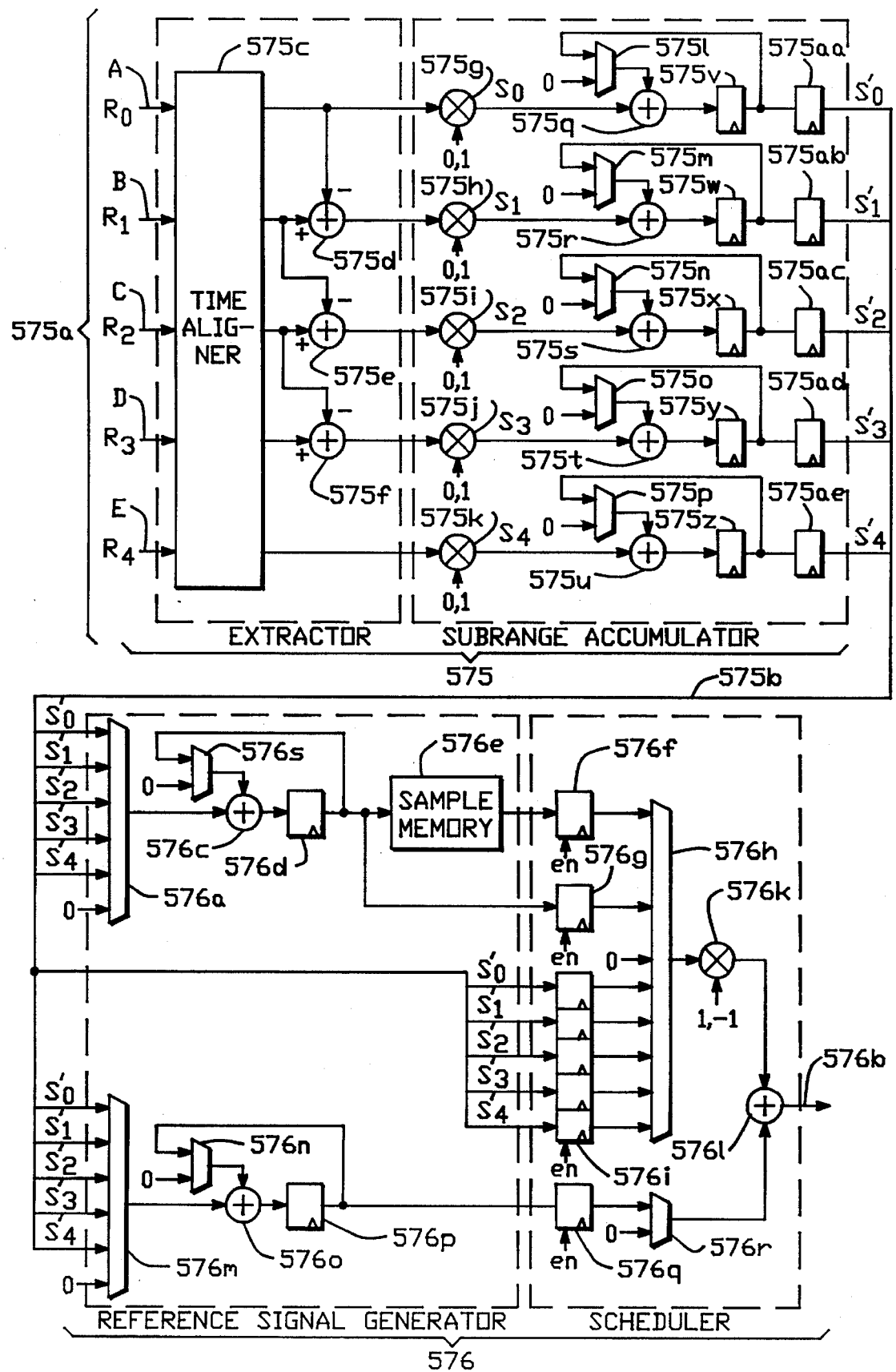
FIG.—9

METHOD AND APPARATUS FOR REAL-TIME, CONCURRENT ADAPTIVE FOCUSING IN AN ULTRASOUND BEAMFORMER IMAGING SYSTEM

CROSS-REFERENCE TO RELATED APPLICATIONS

This Application is related to:

| Title | Inventors | Atty. Docket No. |
|---|---|---|
| METHOD AND APPARATUS FOR RECEIVE BEAMFORMER SYSTEM | J. Nelson Wright Christopher R. Cole Albert Gee | ACUS-1000 SRM |
| METHOD AND APPARATUS FOR TRANSMIT BEAMFORMER SYSTEM | Christopher R. Cole Albert Gee Thomas Liu | ACUS-1001 SRM/WSW |
| METHOD AND APPARATUS FOR FOCUS CONTROL OF TRANSMIT AND RECEIVE BEAMFORMER SYSTEMS | Albert Gee Christopher R. Cole J. Nelson Wright | ACUS-1002 SRM |
| METHOD AND APPARATUS FOR DOPPLER RECEIVE BEAMFORMER SYSTEM | Samuel H. Maslak Christopher R. Cole Joseph G. Petrofsky | ACUS-1003 SRM/WSW |
| METHOD AND APPARATUS FOR A GEOMETRIC ABERRATION TRANSFORM IN AN ADAPTIVE FOCUSING ULTRASOUND BEAMFORMER SYSTEM | J. Nelson Wright Gregory L. Holley Donald R. Langdon | ACUS-1005 SRM/KJD |
| METHOD AND APPARATUS FOR COHERENT IMAGE FORMATION | J. Nelson Wright Samuel H. Maslak David J. Finger Albert Gee | ACUS-1006 SRM |
| METHOD AND APPARATUS FOR ADJUSTABLE FREQUENCY SCANNING IN ULTRASOUND IMAGING | J. Nelson Wright Christopher R. Cole Albert Gee Hugh G. Larsen Samuel H. Maslak | ACUS-1022 SRM/WSW |

The related patent applications are all commonly assigned with the present application, filed concurrently with the present application, and are all incorporated herein by reference in their entirety.

I. FIELD OF THE INVENTION

The present invention relates to ultrasound imaging and, in particular, to adaptive focusing ultrasound imaging systems which provide aberration correction values for distorted ultrasound beams caused by an aberrating region.

II. BACKGROUND OF THE INVENTION

A. Description of the Related Art

Ultrasound imaging systems use time delays and/or phase rotation means to form focused ultrasound beams. On transmit, time delays and/or phase rotation means are used to bring ultrasound pulses from different transducer elements to the desired focal point with temporal alignment and phase coherence. Likewise, on receive, time delays and/or phase rotation means are used to bring reflected ultrasound pulses arriving at different transducer elements from the desired focal points into temporal alignment and phase coherence. The time delays and phases used to focus the ultrasound beam are specified assuming a constant propagation velocity (nominally 1540 m/s in human soft tissue) in the medium through which ultrasound pulses propagate.

However, human soft tissue is not homogenous; it is composed of regions of acoustically differing tissues, such as fat, muscle and blood, in which the local propagation velocity varies. The path dependent speed of sound in tissue distorts the transmitted and reflected wavefronts propagating through the tissues by introducing delay variations from the nominal. These delay variations degrade the quality of focus, thus reducing the spatial resolution and contrast resolution seen in the image.

B. Patents and Literature

By way of example, the following United States patents and literature, all of which are incorporated by reference herein, discuss various aspects of ultrasound imaging. The patents and literature include:

1. Patents

| U.S. Pat. No.: | Title: | Inventor(s): |
|---|---|---|
| 4,471,785 | ULTRASONIC IMAGING SYSTEM WITH CORRECTION FOR VELOCITY IN-HOMOGENEITY AND MULTIPATH INTERFERENCE USING AN ULTRASONIC IMAGING ARRAY | David A. Wilson James L. Buxton Philip S. Green Donald J. Burch John Holzener S. David Ramsey, Jr. |
| 4,817,614 | METHOD AND APPARATUS FOR ADAPTIVE FOCUSING IN A MEDICAL ULTRASOUND IMAGING APPARATUS | Dietrich Hassler Heinz Eschenbacher Wolfgang Haerer |
| 4,835,689 | ADAPTIVE COHERENT ENERGY BEAM FORMATION USING PHASE CONJUGATION | Matthew O'Donnell |
| 4,852,577 | HIGH SPEED ADAPTIVE ULTRASONIC PHASED ARRAY IMAGING SYSTEM | Stephen W. Smith Gregg E. Trahey |
| 4,937,775 | APPARATUS FOR THE THE CROSS-CORRELATION OF A PAIR OF COMPLEX SAMPLED SIGNALS | William E. Engeler Matthew O'Donnell |
| 4,989,143 | ADAPTIVE COHERENT ENERGY BEAM | Matthew O'Donnell Stephen W. Flax |

| U.S. Pat. No. : | Title: | Inventor(s): |
|---|---|---|
| | FORMATION USING ITERATIVE PHASE CONJUGATION | |
| 5,113,866 | METHOD FOR ULTRASOUND IMAGING | Dietrich Hassler Klaus Killig |
| 5,172,343 | ABERRATION CORRECTION USING BEAM DATA FROM A PHASED ARRAY ULTRASONIC SCANNER | Matthew O'Donnell |

2. Literature a. R. Muller, et al., "Real-time Correction of Atmospherically Degraded Telescope Images Through Image Sharpening," Journal of the Optical Society of America, Vol. 64, pp. 1200–1210, 1974.

b. D. Rachlin, "Direct Estimation of Aberrating Delays in Pulse-echo Imaging Systems," Journal of the Acoustical Society of America, Vol. 88, pp. 191–198, July 1980.

c. M. Hirama, et al., "Adaptive Ultrasonic Array Imaging System Through an Inhomogeneous Layer," Journal of the Acoustical Society of America, Vol. 71, pp. 100–109, January 1982.

d. T. Yokota, et al., "Active Incoherent Ultrasonic Imaging Through an Inhomogeneous Layer," Journal of the Acoustical Society of America, Vol. 77, pp. 144–152, January 1985.

e. S. Flax, et al., "Phase Aberration Correction Using Signals From Point Reflectors and Diffuse Scatters," IEEE Transactions on Ultrasonics, Ferroelectrics, and Frequency Control, Vol. 35, pp. 758–774, November 1988.

f. E. Attia, et al., "Self-Cohering Large Antenna Arrays Using the Spatial Correlation property of Radar Clutter," IEEE Transactions on Antennas and Propagation, Vol. 37, pp. 30–38, January 1989.

g. L. Nock, et al., "Phase Aberration Correction In Medical Ultrasound Using Speckle Brightness As a Quality Factor," Journal of the Acoustical Society of America, Vol. 85, pp. 1819–1833, May 1989.

h. B. Steinburg, et al., MICROWAVE IMAGING TECHNIQUES, Chap. 8–9, John Wiley & Sons, Inc., 1991.

i. M. O'Donnell, et al., "Correlation-Based Aberration Correction in the Presence of Inoperative Elements," IEEE Transactions on Ultrasonics, Ferroelectrics, and Frequency Control, Vol. 39, pp. 700–707, November 1992.

j. B. Steinburg, "A Discussion of Two Wavefront Aberration Correction Procedures," Ultrasonic Imaging, Vol. 14, pp. 387–397, 1992.

All of the above disclose systems for determining aberration corrections using special adaptive modes nonconcurrent with imaging which may be used to correct nominal focusing delay and phase values during transmit beamformation and/or receive beamformation for the defocusing effects caused by aberrating regions. U.S. Pat. Nos. 4,471,785, 4,817,614 and 4,852,577 show means to determine focusing corrections at a single depth and to apply the aberration correction values obtained during the adaptive mode to all focal points during the imaging modes.

However, because optimal aberration corrections vary as the focus is dynamically varied in depth during receive beamformation, corrections determined at a single depth (or a few depths) do not optimally correct focus at all depths. On the other hand, determining aberration corrections at many depths through direct measurement, as suggested by U.S. Pat. Nos. 4,835,689, 4,937,775, 4,989,143 and 5,172,343, may require undesirable increases in 1) processing power, 2) computation time (which may slow frame rate), 3) memory, and 4) the number of non-imaging scan lines (which further slows frame rate).

None of the related art is able to take aberration correction values obtained from one range, scan mode, geometry, and transmit frequency and apply them to alternative ranges, alternative scan modes, alternative scan geometries, and/or alternative transmit/receive frequencies. For example, if an imaging system were to acquire both color Doppler flow scan lines (F-mode) using a steered linear scan geometry and gray scale image scan lines (B-mode) using a Vector® scan geometry, the related art systems would require separate aberration correction values for each mode, geometry, and frequency and would not be able to use aberration correction values obtained from one mode, geometry, and frequency to apply to the other modes, geometries, and frequencies.

Accordingly, it is desired to provide a method and apparatus for determining aberration correction values that can be applied for all focal points for any scan mode, scan geometry or frequency without reducing frame rate or requiring special or separate acquisition modes apart from normal imaging modes.

III. SUMMARY OF THE INVENTION

Therefore, a method and apparatus is provided for determining aberration correction values concurrent with imaging at real-time, per-scan-line rates for transmit and receive beamforming in 1) any single mode or mixed modes, 2) any scan geometry format, 3) multiple transmit and receive beam embodiments, 4) synthetic aperture embodiments, 5) sliding aperture embodiments, 6) scan line synthesis embodiments and/or 7) adjustable frequency per scan line format without requiring a special "adaptive mode," "measurement mode," or "probe beam" which would limit image frame rate.

This is accomplished in the present invention by local aberration value estimators and a central adaptive focus processor. Aberration value estimators measure aberration correction values required for focusing through an aberrating region in a subject to be imaged. Aberration correction values are estimated for each scan line or for a subset of scan lines for one range or for a plurality of ranges in an imaged subject. Aberration value estimators measure aberration correction values at one or more ranges while the ultrasound system is imaging in B-mode (gray-scale imaging). An adaptive focus processor reads the aberration correction values from the aberration value estimators and increments or replaces previously measured aberration correction values. Aberration correction values are processed and written to a delay table. Aberration correction values from the delay table are then accessed using means to correct focusing for depths, scan geometries, and imaging modes other than the depth, scan geometry and imaging mode for which aberration correction values are determined.

A. Adaptive Method and Apparatus Operates Concurrently With Imaging Modes

According to an aspect of the present invention, the method and apparatus measures aberration correction values during an ultrasound system imaging frame time and the ultrasound system transmits ultrasound beams and receives ultrasound beams using the measured aberration correction values during the ultrasound system frame time. The measuring of aberration correction values does not interrupt the transmitting or receiving of ultrasound beams.

Thus, an advantage of the present invention is that a separate "probe," "adaptive mode", and/or "measurement mode" is not necessary. The present invention operates in real time by not requiring additional ultrasound system scan lines to support a separate adaptive mode. The concurrent operation of an adaptive method and apparatus during imaging eliminates the reduction effect an "adaptive mode" has on imaging frame rate. In addition, the ultrasound system does not have to compensate for 1) an interrupt to start a separate "adaptive mode" or 2) the uncertainty as to when a return will occur from a separate "adaptive mode" which requires convergence.

B. Aberration Correction Values Measured and Applied in Mixed Modes, Even When Using Multiple Scan Formats According to another aspect of the present invention, the transmitting and receiving of ultrasound beams compensated by aberration correction values occurs during various types of mixed modes, such as a combined B-mode (gray-scale imaging) and F-mode (flow or color Doppler imaging).

Another advantage of the present invention is that aberration correction values, preferably determined only during B-mode scanning (gray-scale imaging), can still be applied to non-B-mode (non-gray-scale imaging) scan lines, such as F-mode (flow or color Doppler imaging) scan lines.

According to another aspect of the present invention, the adaptive apparatus and method operates during various scan geometries, including, but not limited to, sector, Vector®, linear, curved-linear, steered linear, steered curved-linear, and curved Vector®.

C. Compound and Sequential Transmit Focus Measurement Capability

A further advantage of the present invention is that the adaptive method and apparatus can measure multiple aberration correction values per scan line obtained from multiple simultaneous transmit excitations (compound focusing) or multiple sequential transmit excitations (sequential focusing) along the same scan line, in contrast to prior art which obtained a single measurement per scan line.

D. Multiple Transmit and Receive Beams, Synthetic Aperture, Sliding Aperture and Scan Line Synthesis Still another advantage of the present invention is that the adaptive method and apparatus is compatible with multiple transmit beams, multiple receive beams, synthetic aperture beams and/or sliding apertures. (Sliding apertures presented in U.S. Pat. No. 4,699,009 by inventors S. H. Maslak and H. G. Larsen entitled DYNAMICALLY FOCUSED LINEAR PHASED ARRAY ACOUSTIC IMAGING SYSTEM, issued to Acuson on Oct. 13, 1987) which is incorporated by reference herein. Further, the present invention supports the novel features of scan line synthesis as described and claimed in the referenced co-pending patent application entitled: METHOD AND APPARATUS FOR COHERENT IMAGE FORMATION.

E. Aberration Correction Values Support Adjustable Frequency Per Scan Line

In another aspect of the invention, the adaptive method and apparatus supports adjustable frequency scanning in order to mitigate grating lobes as described and claimed in the referenced co-pending patent application entitled: METHOD AND APPARATUS FOR ADJUSTABLE FREQUENCY SCANNING IN ULTRASOUND IMAGING.

In another aspect of the invention, the adaptive method and apparatus maintains phase-alignment among coherent scan lines, whether these scan lines came from actual received beams or were synthesized scan lines created as described and claimed in the referenced co-pending patent application entitled: METHOD AND APPARATUS FOR COHERENT IMAGE FORMATION. Maintaining such coherence is necessary for scan line synthesis when there is scan-line-to-scan-line frequency differences as existing during adjustable frequency scanning.

F. Adaptive Method and Apparatus Independent of Means to Apply Aberration Correction Values to All Scanned Regions Another advantage of the present invention is that the adaptive method and apparatus is independent from any means for applying the aberration correction values obtained from one region of an imaged subject to other regions. While in the preferred embodiment, the adaptive method and apparatus operates in conjunction with the novel features of the Geometric Aberration Transform (GAT™) described and claimed in the referenced co-pending patent application entitled: METHOD AND APPARATUS FOR A GEOMETRIC ABERRATION TRANSFORM IN AN ADAPTIVE FOCUSING ULTRASOUND BEAMFORMER SYSTEM, other methods would also be supported by the present invention. By way of example only, aberration correction values obtained from measurements in a single region, such as those acquired while scanning at a common focal depth, could be used elsewhere in an image using a nearest neighbor rule, which assigns the aberration correction value of the nearest measurement point to the image point being corrected. In another example, multiple aberration correction measurement regions, such as those acquired from multiple focal depths while scanning, could be coupled with means of interpolation to more accurately estimate aberration correction values elsewhere in an image.

G. Programmable Aberration Value Estimator Measurement

According to yet another aspect of the present invention, an aberration value estimator computes aberration correction value estimates by selectively processing various groupings and sums of received ultrasound signals from transducer elements. Transducer elements of an ultrasound array in an ultrasound system are grouped into a plurality of subarrays. Preferably, a subarray includes four transducer elements, but it could be as small as a single element. The aberration value estimator selectively obtains aberration correction values per transmit scan line and per selected range by: 1) cross-correlating baseband focused received ultrasound signals from a first subarray and a second subarray, 2) cross-correlating a baseband focused received ultrasound signal from a first subarray with a sum of baseband focused ultrasound signals from a plurality of subarrays (which plurality may be all subarrays), or 3) cross-correlating either a baseband focused received ultrasound signal (from a first subarray) or a sum of baseband focused ultrasound signals (from a plurality of subarrays) with a value stored in aberration value estimator memory. The value stored in the aberration value estimator memory can be either a previously received ultrasound signal from a subarray or a sum of previously received ultrasound signals from a plurality of subarrays.

According to another aspect of the present invention, the adaptive focus processor can program the manner of measuring aberration correction values in the aberration value estimator.

H. Aberration Correction Values Applied to Both Transmit and Receive Beamformation According to another aspect of the present invention, the adaptive method and apparatus may selectively apply measured aberration correction values to transmit beamformation, to receive beamformation, or to both transmit and receive beamformation.

I. Local Measurement Processing Per Scan Line

In another aspect of the present invention, each aberration value estimator operates with a small plurality of subarrays so that its measurements can be accomplished with a processing apparatus local to those subarrays. Furthermore, the processing permits additional windowing and averaging that can greatly reduce (decimate) the measurement reporting rate to a central adaptive focus processor relative to the original subarray data rate.

According to another aspect of the present invention, the aberration value estimator can be programmed with a subrange averaging window to select baseband focused receive ultrasound signals for each subarray to sum the subarray signal prior to correlation, which reduces the correlation processing rate and reduces the eventual reporting rate to the central adaptive focus processor.

According to yet another aspect of the present invention, each aberration value estimator can be programmed with a range averaging window to select a plurality of instantaneous correlations to sum to obtain an aberration correction value associated with the center of the range window, further reducing the eventual reporting rate to the central adaptive focus processor.

According to a further aspect of the invention, the aberration value estimator can be programmed to filter or average in azimuth aberration correction values associated with the same range window of the previous step across all ultrasound scan lines within an azimuth window. Aberration correction values associated with a plurality of ultrasound scan lines in the azimuth window are multiplied by selected filter weighting coefficients for each ultrasound line. The products are then summed to obtain an aberration correction value associated with the center of the azimuth window. The weighing coefficients are programmed by the adaptive focus processor. This programming permits tapering of the filter size and adjustment of the filter coefficients for scan lines near or at the scan frame edges to eliminate edge effects.

In another aspect of the present invention, a first aberration value estimator and a second aberration value estimator are coupled to the adaptive focus processor. The adaptive focus processor reads measured aberration correction values from each aberration value estimator.

J. Central Application Processing Per Aperture

In a further aspect of the present invention, locally processed per-subarray aberration correction values covering the entire receive aperture are reported to and converted by a central adaptive focus processor into per-subarray aberration delay corrections.

According to yet another aspect of the present invention, the adaptive focus processor conversion of the subarray aberration correction values is enhanced to produce smooth per-subarray aberration delay correction profiles across an aperture by means of polynomial fitting the subarray aberration delay correction values.

According to still another aspect of the present invention, the adaptive focus processor rejects unreliable aberration correction values and removes offset and slope trends from accepted aberration correction values across an aperture.

According to another aspect of the present invention, the adaptive focus processor applies a look-up rule to map aberration correction values from measurement regions to other points in other regions defined by the scan geometry.

Other aspects and advantages of the present invention can be seen upon review of the figures, the detailed description, and the claims which follow.

IV. BRIEF DESCRIPTION OF THE FIGURES

FIGS. 1a and 1b conceptually depict the transmission and reception of ultrasound beams along scan lines to and from body tissue.

FIGS. 2a–c illustrate an ultrasound imaging system, including a digital transmit beamformer, digital receive beamformer, Doppler receive beamformer, beamformer central control, and adaptive focusing control systems according to the present invention.

FIG. 9 illustrates an extractor and subarray accumulator 575 and reference signal generator and scheduler 576 shown in FIG. 8 according to the present invention.

V. DETAILED DESCRIPTION OF THE PREFERRED EMBODIMENT

The present invention represents a component of a medical ultrasound imaging system for which additional patent applications, listed above, have been simultaneously filed in the United States Patent and Trademark Office. These applications are hereby incorporated by reference.

Figure 2A:
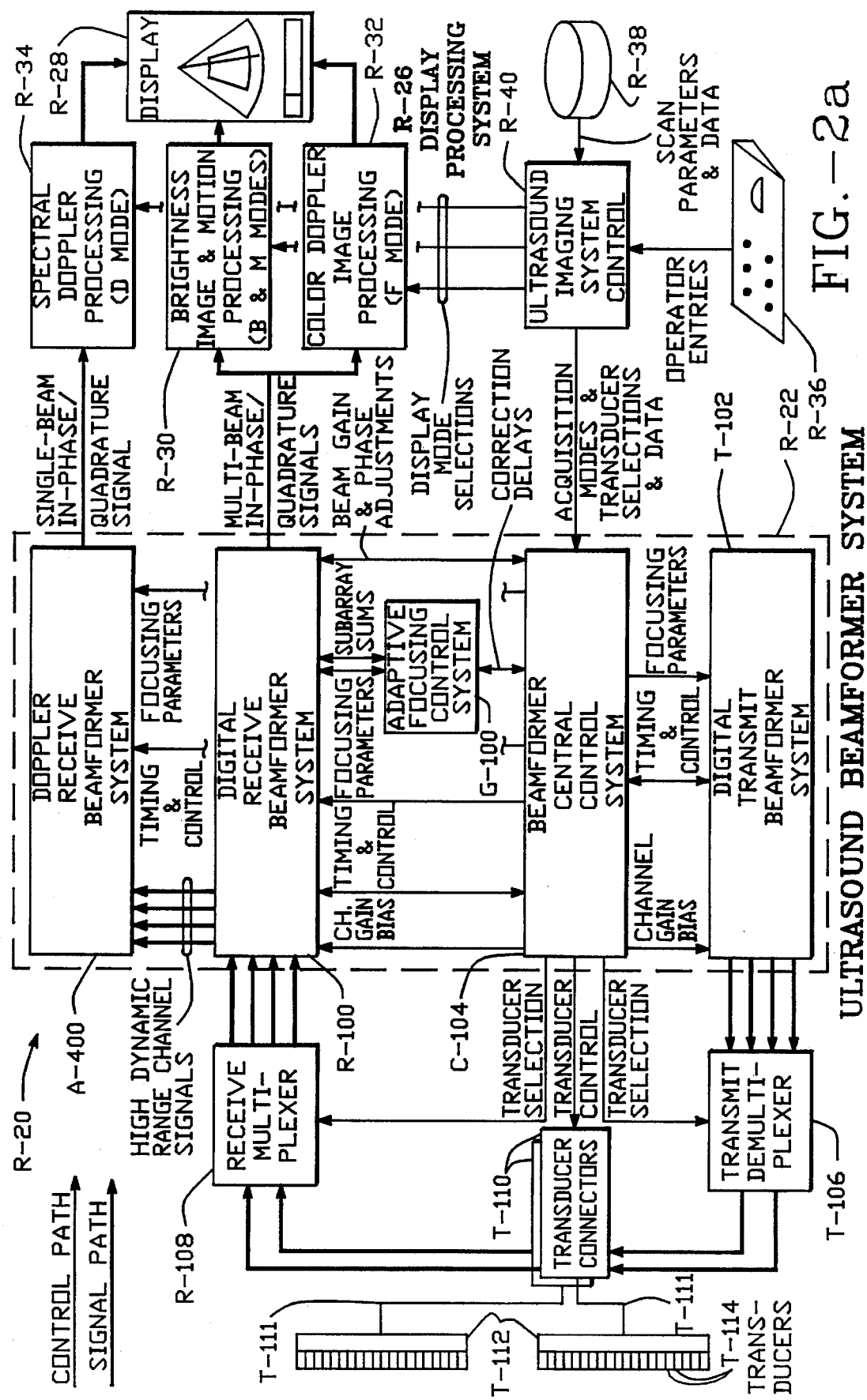
Figure 2B:
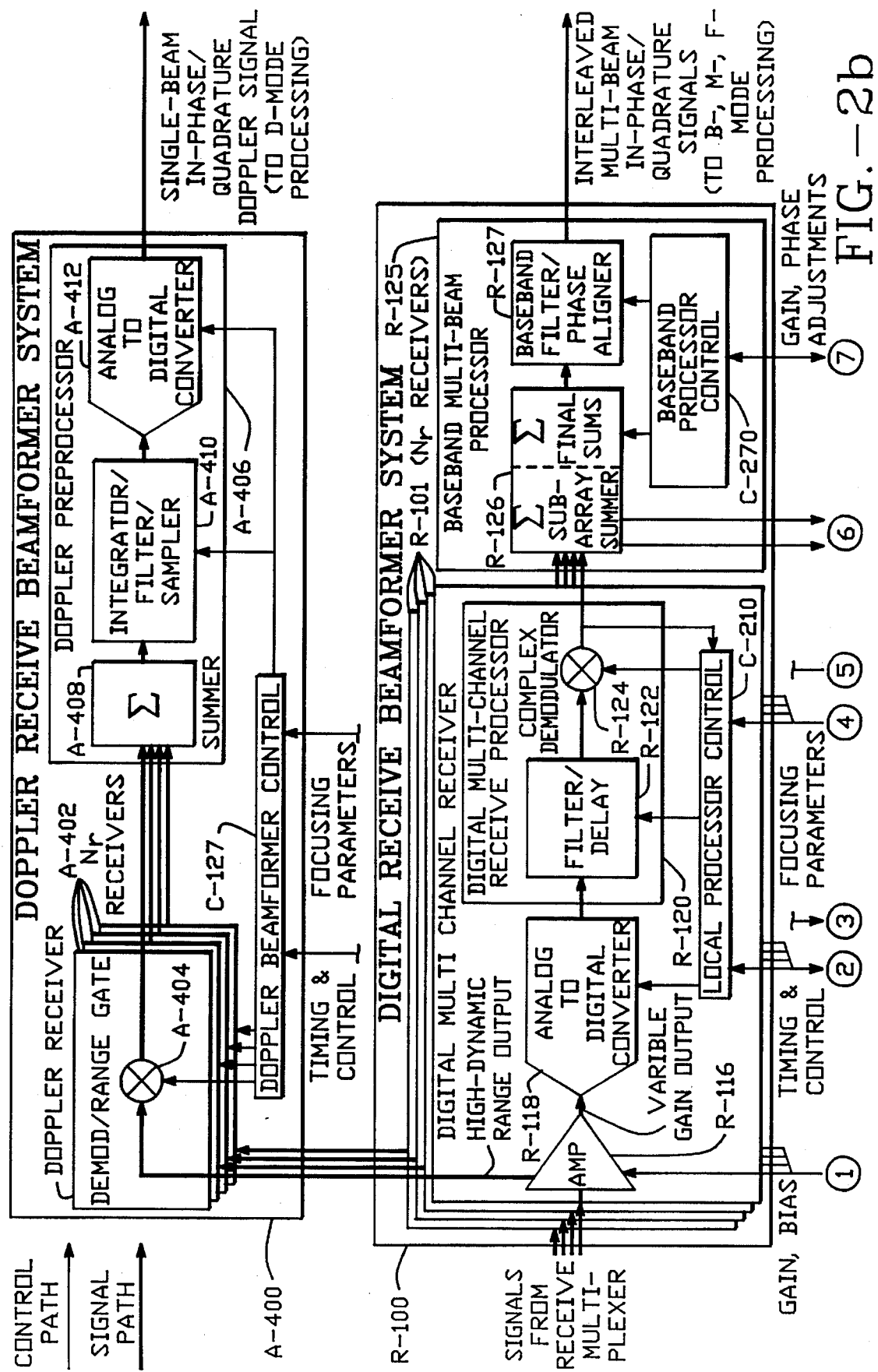
Figure 3:
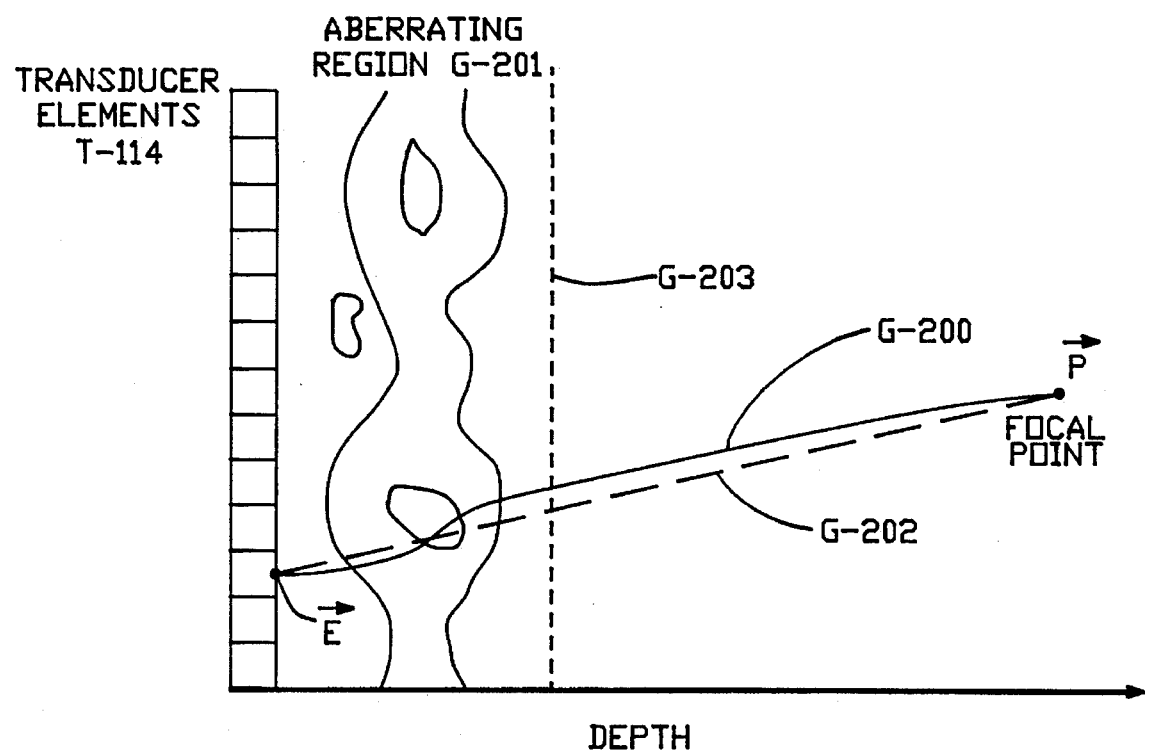
FIG. 3 illustrates distorted and undistorted scan lines passing through an aberrating region to a focal point in a subject.
Figure 4:
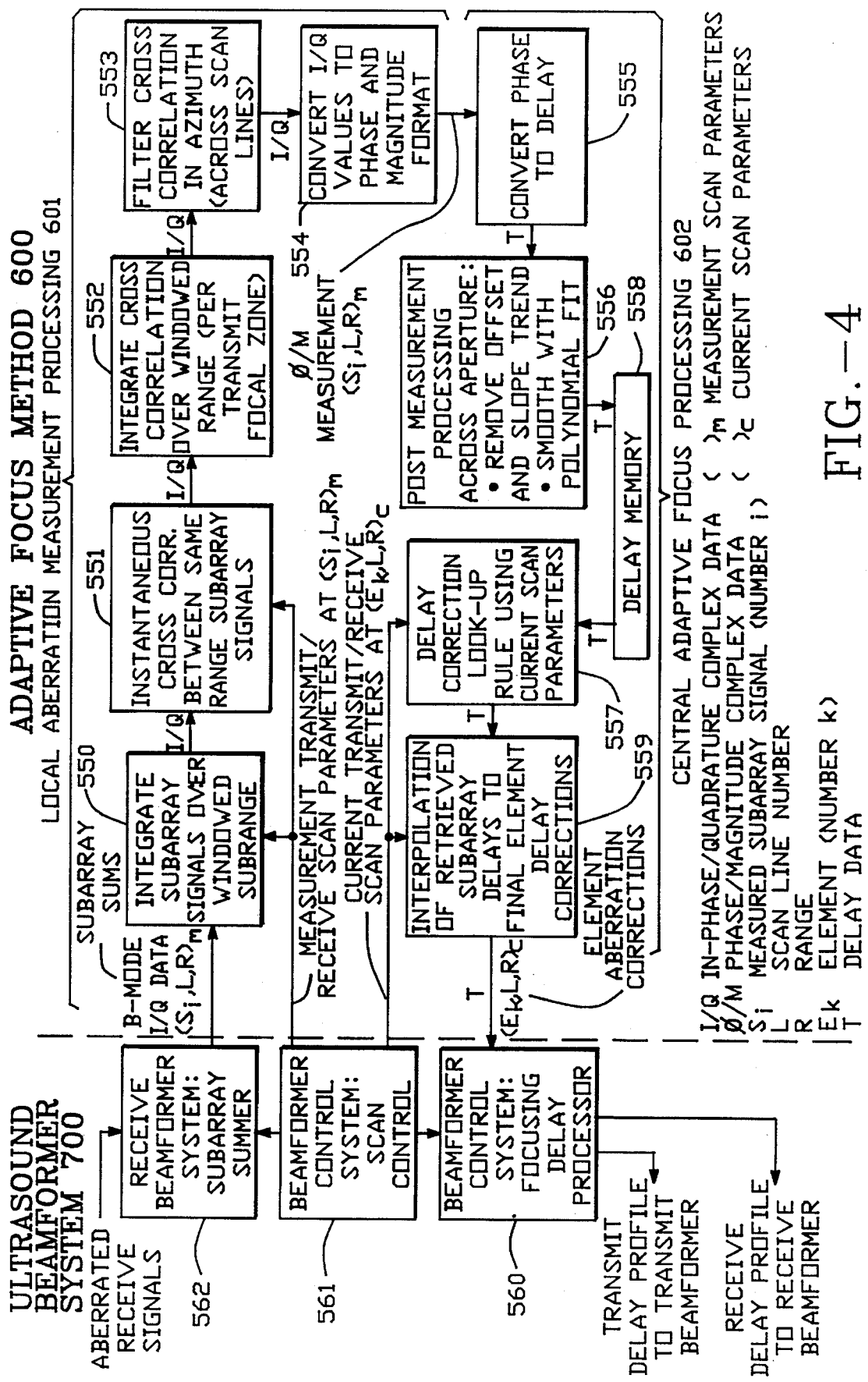
FIG. 4 illustrates a real-time, concurrent adaptive focusing method block diagram consisting of local measurement processing and central adaptive focus processing according to the present invention.
Figure 5:
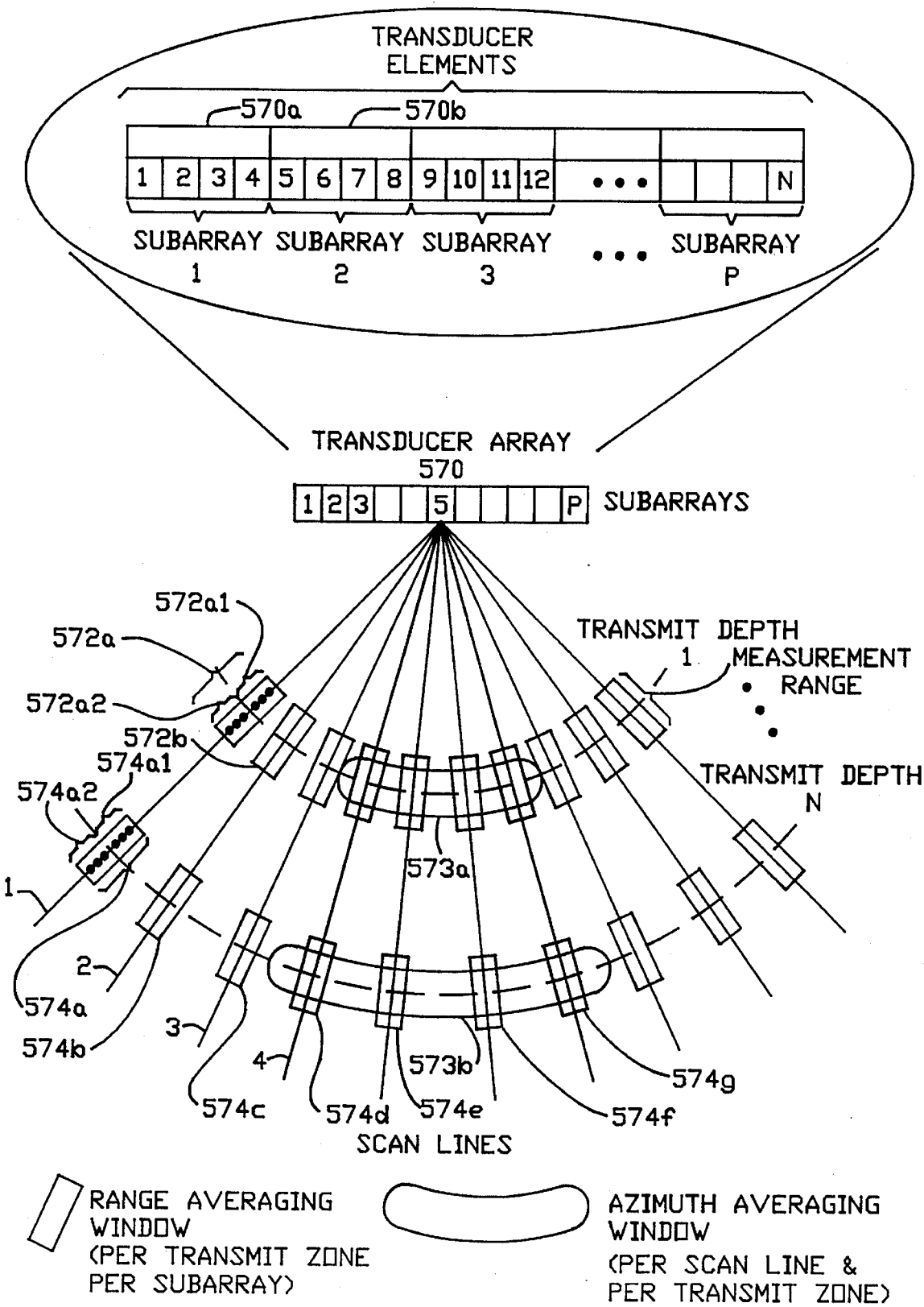
FIG. 5 illustrates transducer element subarray grouping with subrange, range and azimuth averaging windows according to the present invention.

FIGS. 1a–b and 3 conceptually depict with scan lines the transmission and reception of ultrasound beams to and from body tissue. FIGS. 2a–c illustrate an ultrasound imaging system having the real-time, concurrent adaptive focusing control system G-100 according to the present invention. FIGS. 4 and 5 illustrate a concurrent adaptive focusing method according to the present invention. Finally, FIGS. 6–9 illustrate a real-time, concurrent adaptive focusing interface and apparatus according to the present invention.

A. Definitions

1. Scan Lines

A scan line is a straight line through an imaged medium on which samples of the image are presumed to lie. A transmit scan line is such a line on which an associated transmit beam is presumed to lie. A receive scan line is such a line on which an associated receive beam is presumed to lie. A scan line is spatially localized by its origin along a transducer array, its azimuthal angle with respect to a line normal to the array face, and its elevation with respect to the normal line. For planar imaging, the elevation will be assumed fixed and only the azimuth angle will be required for later discussions in this specification.

2. Subarrays

A subarray is any grouping of transducer elements, including the special case of a single transducer element. In the preferred embodiment of this invention, a subarray typically comprises four spatially adjacent elements.

3. Measured Aberration Correction Values

Measured aberration correction values are metrics that represent deviations, obtained from a measurement scan line at a measurement depth (range) for a given transducer element, from the ideal parameters that achieve ideal transmit focusing, ideal receive focusing, or both, due to an aberrating region in the image. In the preferred embodiment, the values are delay variations (possibly measured as phase differences and later converted to delays), although other values may be used, such as both delay and amplitude variations. Measured correction values and measured values are used interchangeably for measured aberration correction values.

4. Correction Profile

A correction profile is a sequence of aberration correction values as a function of transducer element position.

5. Location

A location is a point position in the image uniquely determined by scan line number and depth (range) along that scan line from the scan line origin.

6. Current Location, Current Scan Line, Current Range

Current shall refer to beamformation operations in progress during a scan for which the ultrasound system is programmed. Thus, a current scan line is associated with either a transmit beam about to be fired, or a receive beam about to be acquired. A current range is the depth where processing is about to occur. Current location or current point is the location given by the current scan line and current range.

7. Scan Line Number

The scan line number is a single index that uniquely corresponds to the three spatial location attributes of a scan line (line origin, azimuth angle, elevation angle).

8. Geometric Aberration Transform (GAT™) Index Value

The GAT™ index value is a scan line number output by the GAT™ index function.

9. Correction Location

The correction location, or correction point, is one of a plurality of points for which an aberration correction value is needed during a scan, uniquely determined by a correction scan line and a correction depth. In the apparatus section below, correction location, correction scan line, and correction depth (range) are also referred to as current focal point, current scan line, and current depth, respectively.

10. Frame Time

The frame time is the time interval required to scan the defined imaging field of view with a sequence of transmit beams. The inverse of the frame time is the frame rate when the scan sequence is repeated periodically. When operating in mixed modes, in which B-mode imaging transmit beams are interleaved with other transmit beams supporting other normal ultrasound system acquisitions such as M-mode, D-mode, or color Doppler mode, the frame time shall include the additional transmit beam events to support these mixed modes.

B. Overview of the Preferred Beamformer System Architecture

1. Ultrasound Signal Description

With respect to the present invention, ultrasound imaging is accomplished by firing (transmitting) into body tissue or other objects to be imaged a scan sequence of focused ultrasonic beams centered along straight lines in space called transmit scan lines (FIG. 1a). The transmit scan lines are generated by a transmit beamformer and an ultrasound transducer array. The transmit scan lines are spaced to produce a planar linear, planar sector or other display of the tissue via a pre-defined firing or scanning pattern. Focused to some defined depth in the tissue, the ultrasonic transmit continuous-wave (CW) or pulse-wave (PW) signal, propagating at an assumed constant propagation velocity of nominally c=1540 m/sec through the tissue, interacts with the tissue and reflects a small portion of the signal back to the ultrasound transducer array that initiated the ultrasound signal. The round trip delay time is shortest for those targets closest to the ultrasound transducer array, and longest for those targets farthest from the transducer array. With the application of appropriate time delays, the receive beamformer (FIG. 1b) can dynamically focus receive beams along straight lines in space called receive scan lines commencing, for example, with the shallowest range (depth) of interest and evolving toward the deepest range of interest.

FIGS. 1a and 1b depict representations of transmit and receive scan lines (solid) and straight-line signal propagation paths from individual elements (dashed), respectively. In FIG. 1a, the transmit beamformer is generally identified by T-50 with the transducer array T-52 containing a multiplicity of individual transducer elements T-54 organized as a linear phased array in this particular embodiment. As is known in the art, there are a great variety of transducer array configurations available for use with ultrasound transmit and receive beamformer systems. As can be seen in FIG. 1a, the transmit beamformer T-50 sends appropriately time-delayed electrical signals to the individual transducer elements T-54. These transducer elements T-54 then in turn convert electrical signals into acoustic waves that propagate into the body tissue T-56. By applying different time delays to the excitation signals sent to the individual transducer elements T-54, transmit scan lines T-60 and T-62, having respective foci $r_1$ and $r_2$, can be established. It is to be understood that each of these transmit scan lines is representative of a center line of a different transmit beam which is steered and focused into the body to be imaged.

The transmit beamformer T-50 can generate simultaneous multiple beams along different scan lines, or different focal depths along the same scan line (compound focus). Further, the multiple transmit beams can each scan the entire image format or be transmitted such that each of the multiple beams only scans a specified section of the image format.

FIG. 1b depicts a digital receive beamformer R-58 which is also connected to the transducer array T-52. Also depicted in FIG. 1b are receive scan lines R-64, R-66 corresponding to a dynamically focused first receive beam and a dynamically focused second receive beam, respectively. The beams are sampled in range at a plurality of focal depths ($r_1$, $r_2$, $r_3$) along each scan line. In the digital receive signal path of the present invention, transducer array signals can be selectively separated into data representative of multiple individual beams.

Each scan line of a transmit or receive scan pattern can be parameterized by the origin on the transducer array, the scan line orientation (angle θ) and the focus depth or range (r). The ultrasound imaging system of the present invention stores a pre-computed sparse data set of focusing time delay and aperture apodization values indexed by these parameters (based on geometric considerations as is known in the art) and expands the values by real-time computational means to control the transmit and receive beamformation systems that produce the desired scan lines.

2. Beamformer System

FIGS. 2a, 2b, 2c depict an overall block diagram of a medical ultrasound imaging system R-20. Ultrasound system R-20 includes a beamformer system R-22, one or more transducers T-112, a display processing system R-26 with a display R-28 and an ultrasound imaging system control R-40.

In FIGS. 2a, 2b, or 2c, the beamformer system R-22 includes inventive and novel (1) digital transmit beamformer system T-102, (2) digital receive beamformer system R-100, (3) beamformer central control system C-104, (4) adaptive focusing control system G-100 and (5) Doppler receive beamformer system A-400. These systems are depicted as high level, functional block diagrams. The blocks are abstracted from the actual implementation of a preferred embodiment in order to better illustrate the signal processing functions performed.

As indicated in FIG. 2a, beamformer system R-22 provides two sources of digital beam data to the display processing system R-26: (1) Doppler receive beamformer single-beam complex in-phase/quadrature data representing coherent temporal sampling of the beam (CW case) or coherent temporal sampling at one range location along the beam (PW case), and (2) digital receive beamformer multi-beam complex in-phase/quadrature data representing coherent sampling in range along each receive scan line. Beamformer system R-22 can be operated to provide a sequence of scan lines and associated samples as above to provide data for a variety of display modes. By way of example, possible display modes and their associated processors include (1) brightness image and motion processor R-30 for B-mode (gray-scale imaging) and M-mode (motion display), (2) color Doppler image processor R-32 for F-mode (flow imaging), and (3) spectral Doppler processor R-34 for D-mode. Additional display modes can be created from the two complex data sources of R-22, as will be obvious to those skilled in the art.

Ultrasound system R-20 also includes a transmit demultiplexer T-106 for routing the output waveforms from the transmitters T-103 to the transducer elements T-114, a receive multiplexer R-108 for routing the input waveforms from the transducer elements T-114 to the receivers R-101, one or more transducer connectors T-110 and transducer arrays T-112. Many types of transducer arrays can be used with the present system.

Ultrasound system R-20 also includes an ultrasound imaging system control R-40, archival memory R-38 for storing scan parameters and scan data, and operator interface R-36.

As used herein, the term ultrasonic refers to frequencies above the range of human hearing. However, the transducer arrays T-112 are optimized for frequencies typically within the range of 2–10 MHz.

The transducer array T-112 is interchangeable with a variety of different kinds of transducer arrays, including but not limited to linear, curved, curvi-linear and annular transducer arrays. A variety of transducer array shapes and frequencies are desirable in order to satisfy the requirements of a variety of different clinical settings. However, the transducer arrays T-112 are typically optimized for frequencies within the above specified range of 2–10 MHz. The medical ultrasound system R-20 performs the three major functions of driving the ultrasonic transducer array of elements T-114 to transmit focused ultrasound energy, receiving and focusing back-scattered ultrasound energy impinging on the transducer array T-114, and controlling the transmit and receive functions to scan a field of view in scan formats including (but not limited to) linear, sector or Vector® format.

In FIGS. 2a, 2b, 2c, the control signals are communicated over the light lead lines while the signal paths are depicted with heavy lead lines.

3. Digital Transmit Beamformer System

The digital transmit beamformer T-102 (FIG. 2c) is the subject of the above-identified application entitled: METHOD AND APPARATUS FOR TRANSMIT BEAMFORMER SYSTEM which has been incorporated herein by reference. It is to be understood that in a preferred embodiment, the digital transmit beamformer T-102 is comprised of a plurality of digital multi-channel transmitters T-103, one digital multi-channel transmitters for one or more of the individual transducer elements T-114. The transmitters are multi-channel in that each transmitter can process, in a preferred embodiment, up to four independent beams. Thus, for example, 128 multi-channel transmitters have 512 channels. In other preferred embodiments, more than four independent beams can be achieved. Processing more than four beams per processor is within the scope of the invention.

In a preferred embodiment, each of the digital multi-channel transmitters T-103 produces as its output in response to an excitation event the superposition of up to four pulses, each pulse corresponding to a beam. Each pulse has a precisely programmed waveform, whose amplitude is apodized appropriately relative to the other transmitters and/or channels, and delayed by a precisely defined time delay relative to a common start-of-transmit (SOT) signal. Transmitters T-103 are also capable of producing CW.

Each digital multi-channel transmitter T-103 conceptually comprises a multiple beam transmit filter T-115 which provides an output to a complex modulator T-117. The output from complex modulator T-117 is communicated to a delay/filter block T-119, and therefrom is provided to a digital-to-analog converter (DAC) T-121. The output of the DAC T-121 is amplified by an amplifier T-123. The multiple beam transmit filter T-115, the complex modulator T-117 and the delay/filter block T-119 comprise a digital multi-channel transmit processor T-104.

The transmit filter T-115 can be programmed to provide any arbitrary real or complex waveform responsive to a start-of-transmit (SOT) signal. The transmit filter T-115 is implemented with a memory which stores real or complex samples of any desired and arbitrary pulse waveform, and a means of reading the samples out sequentially in response to the start-of-transmit (SOT) signal delayed by a component of the focusing delay. In a preferred embodiment, the memory of T-115 is programmed to store baseband representations of real or complex pulse envelopes.

Block T-115, although primarily a memory, is referred to herein as a transmit filter, as the output of block T-115 can be thought of as the time response of a filter to an impulse. The complex modulator T-117 upconverts the envelope to the transmit frequency and provides appropriate focusing phase and aperture apodization.

Delay/filter block T-119 conceptually provides any remaining focusing delay component and a final shaping filter. The digital-to-analog converter (DAC) T-121 converts the transmit waveform samples to an analog signal. The transmit amplifier T-123 sets the transmit power level and generates the high-voltage signal which is routed by the transmit demultiplexer T-106 to a selected transducer element T-114.

Associated with each multi-channel transmit processor T-104 is a local or secondary processor control C-125 which provides control values and parameters, such as apodization and delay values, to the functional blocks of multi-channel transmit processor T-104. Each local or secondary channel control C-125 is in turn controlled by the central or primary control system C-104.

4. Digital Receive Beamformer System

The digital receive beamformer R-100 (FIG. 2b) is the subject of the above-identified application entitled: METHOD AND APPARATUS FOR RECEIVE BEAMFORMER SYSTEM which has been incorporated herein by reference.

The signals from the individual transducer elements T-114 represent return echoes or return signals which are reflected from the object being imaged. These signals are communicated through the transducer connectors T-110 to the receive multiplexer R-108. Through multiplexer R-108, each transducer element T-114 is connected separately to one of the plurality of digital multi-channel receivers R-101 which taken together and along with the baseband multi-beam processor R-125 comprise the digital receive beamformer R-100 of the invention. The receivers are multi-channel in that each receiver can process, in a preferred embodiment, up to four independent beams. Processing more than four beams per processor is within the scope of the invention.

Each digital multi-channel receiver R-101 can, in a preferred embodiment, comprise the following elements which are represented by the high level function block diagram in FIG. 2b. These elements include a dynamic low-noise and variable time-gain amplifier R-116, an analog-to-digital converter (ADC) R-118, and a digital multi-channel receive processor R-120. The digital multi-channel receive processor R-120 conceptually includes a filter/delay unit R-122 and a complex demodulator R-124. The filter/delay unit R-122 provides for filtering and coarse focusing time delay. The complex demodulator R-124 provides for fine focusing delay in the form of a phase rotation and apodization (scaling or weighting), as well as signal demodulation to or near baseband. The exact functioning and composition of each of these blocks will be more fully described hereinbelow with respect to the remaining figures.

The digital multi-channel receivers R-101 communicate with baseband multi-beam processor R-125 where the signal samples of each beam from each receive processor are summed by summer R-126, and the summation provided to baseband filter/phase aligner R-127. The baseband filter/phase aligner R-127 provides for filtering, and receive-scan-line-to-receive-scan-line or beam-to-beam phase alignment as discussed in the above-referenced and incorporated patent applications entitled: METHOD AND APPARATUS FOR COHERENT IMAGE FORMATION, METHOD AND APPARATUS FOR ADJUSTABLE FREQUENCY SCANNING IN ULTRASOUND IMAGING, and METHOD AND APPARATUS FOR RECEIVE BEAMFORMER SYSTEM.

A local or secondary control C-210 is associated with each digital multi-channel receiver R-101. Local processor control C-210 is controlled by central or primary control C-104 and provides timing, control and parameter values to each said receiver R-101. The parameter values include time delay values and apodization values.

The digital receive beamformer system R-100 additionally includes a baseband processor control (or phase aligner processor control) C-270 which controls the operation of baseband filter/phase aligner R-127 and the summing gain of summer R-126. Baseband processor control C-270 is controlled by central control C-104.

5. Doppler Receive Beamformer System

The Doppler receive beamformer system A-400 for D-mode acquisition includes analog receivers A-402, each of which receives echo signals from a respective one or more transducers T-114. Each of the Doppler receivers A-402 includes a demodulator/range gate A-404 which demodulates the received signal and gates it (PW mode only) to select the echo from a narrow range. The analog outputs of the Doppler receivers A-402 are communicated to a Doppler preprocessor A-406. In preprocessor A-406, the analog signals are summed by summer A-408 and then integrated, filtered, and sampled by analog processor A-410. Preprocessor A-406 then digitizes the sampled analog signal in an analog-to-digital converter (ADC) A-412. The digitized signal is communicated to the display processing system R-26. The Doppler receive beamformer system is the subject of a co-pending patent application entitled: METHOD AND APPARATUS FOR DOPPLER RECEIVE BEAMFORMER SYSTEM which has been incorporated herein by reference.

Associated with all Doppler receivers A-402 is a single local or secondary Doppler beamformer control C-127. Doppler beamformer control C-127 is controlled by central or primary control system C-104 and provides control and focusing parameter values to the Doppler receive beamformer system A-400.

As pointed out in the above patent application describing the Doppler receive beamformer system A-400, the present beamformer system R-22 advantageously combines a digital receive beamformation system R-100 and a Doppler receive beamformation system A-400 in a manner which uses the same digital transmit beamformation system T-102 and the same transducer array and allows the digital receive beamformation system R-100 to be optimized for imaging modes such as B- and F- mode, and therefore has high spatial resolution, while the accompanying Doppler receive beamformation system has a wide dynamic range and is optimized for use in acquiring D-mode signals.

6. Beamformer Central Control System

The beamformer central control system C-104 of the present invention controls the operation of the digital transmit beamformer system T-102, the digital receive beamformer system R-100, the Doppler receive beamformer system A-400, and the adaptive focusing control system G-100. The beamformer control is more fully discussed in the above referenced and incorporated patent application entitled: METHOD AND APPARATUS FOR FOCUS CONTROL OF TRANSMIT AND RECEIVE BEAMFORMER SYSTEMS.

The main control functions of the central control system C-104 are depicted in FIG. 2c. The control functions are implemented with four components. The acquisition control C-130 communicates with the rest of the system including the ultrasound system control R-40 and provides high level control and downloading of scanning parameters. The focusing control C-132 computes in real time the dynamic delay and apodization digital values required for transmit and receive beamformation, which includes pre-computed and expanded ideal values plus any estimated correction values provided by adaptive focusing control system G-100. The front end control C-134 sets the switches for the demultiplexer T-106 and the multiplexer R-108, interfaces with the transducer connectors T-110, and sets the gain and bias levels of all transmitter amplifiers T-123 and all receive amplifiers R-116. The timing control C-136 provides all the digital clocks required by the digital circuits. This includes the sampling clocks for all the transmitter DACs T-121 and receiver ADCs R-118.

In a preferred embodiment central control C-104 expands sparse tables of focusing time delay and aperture apodization values based on pre-computed and stored data, through such techniques as interpolation and extrapolation. The expanded delay and apodization values are communicated to the local processor controls, where the delay and apodization data expansion in range is completed to per-transducer-element, per-sample, per-beam values.

7. Adaptive Focusing Control System

Adaptive focusing control system G-100 provides for real-time concurrent adaptive focusing. Adaptive focusing control system G-100 is comprised of an adaptive focus processor G-505 which provides focus correction delay values to the focus control C-132 of the central control C-104. Adaptive focus processor G-505 operates on output produced by aberration value estimators G-502 from data gathered from the subarray summers R-126 of the digital receive beamformer system R-100. Accordingly, aberration correction values, preferably aberration delay and amplitude values, are adaptively measured for each receive scan line or for a subset of receive scan lines in range regions corresponding to transmit focal depths by the adaptive focusing control subsystem G-100 shown in FIG. 2c. Adaptive focusing control system G-100 is more fully described below.

It is to be understood that in addition to the adaptive focusing control system which adjusts focus delays, that a number of adaptive control systems are contemplated. These systems, by way of example, include (1) adaptive contrast enhancement control system for adjusting focus delays and aperture apodizations, (2) adaptive interference cancellation control for adjusting focus delays and phases, aperture apodizations, and (3) adaptive target enhancement control for adjusting focus delays and phase, aperture apodizations, imaging transmit and receive frequencies and baseband waveform shaping.

Another aspect of adaptive focusing which can be included in the preferred embodiment of the adaptive focusing control system G-100 is a geometric aberration transform (GAT™) device G-508/509 which can provide aberration correction delay values to the adaptive focus processor G-505 for scan lines and scan line depth locations for which measured aberration values were not collected by aberration value estimators G-502. More specifically, measured aberration correction values are written to a delay table in GAT™ G-508/509. GAT™ G-508/509 retrieves values from the delay table according to GAT™ look-up rules to form focusing delay correction profiles across the aperture valid for depths, scan geometries, and acquisition modes other than the depth, scan geometry, and mode at which aberration correction values were measured. The geometric aberration transform device G-508/509 is the subject of above-referenced and incorporated co-pending U.S. patent application entitled: METHOD AND APPARATUS FOR A GEOMETRIC ABERRATION TRANSFORM IN AN ADAPTIVE FOCUSING ULTRASOUND BEAMFORMER SYSTEM.

C. Adaptive Focusing Control System Preferred Embodiment

Inhomogeneities of the speed of sound in tissue through which an ultrasound beam is propagating cause defocusing, broadening of the mainlobe, and elevated sidelobes of the ultrasound beam. The present invention is able to adaptively correct for the effects of these inhomogeneities by making focusing adjustments.

In a phased-array ultrasound system, ideal focusing delays $T_{ideal}$ for each element are calculated to compensate for the variation in propagation time from element E centered at position $\vec{E}$ to a desired focal point $\vec{P}$, illustrated in FIG. 3:

$$T_{ideal} = \frac{|\vec{P} - \vec{E}|}{c_0} \tag{1}$$

where $c_0$ is the nominal speed of sound through a homogeneous medium and $|\vec{P} - \vec{E}|$ represents the Euclidean distance between points $\vec{P}$ and $\vec{E}$.

Equation (1) can also be written as a simple path integral along a straight dashed line G-202 from element position $\vec{E}$ to focal point $\vec{P}$:

$$T_{ideal} = -\frac{1}{c_0} \int_{\vec{P}}^{\vec{E}} ds. \tag{2}$$
$$\text{straight line}$$

in which ds is the line integral path. These desired focusing delays $T_{ideal}$ can be implemented in an ultrasound imaging system using time delay, phase rotation at the mid-band frequency, or, in the preferred embodiment, a combination of the two.

In a subject having an aberrating region G-201, the propagation delay $T_{inhom}$ (and hence the desired focusing delay) generally depends on the speed of sound through an aberrating region G-201. $T_{inhom}$ depends on the propagation time along a distorted (refracted) path represented by curved line G-200 from element position $\vec{E}$ to focal point $\vec{P}$. In integral form, $$T_{inhom} = -\int_{\vec{E}}^{\vec{P}} \frac{1}{c(x,y)} = -\frac{1}{c_0} \int_{\vec{E}}^{\vec{P}} n(x,y) ds, \tag{3}$$
$$\text{refracted path} \qquad \text{refracted path}$$

where $n(x,y)$ is the index of refraction defined by $n(x,y) = c_0/c(x,y)$, and $c(x,y)$ is the spatially varying local speed of sound at a point $(x,y)$ within the propagating medium (which includes both the aberrating region and the non-aberrating region).

For the case of relatively small variations in the speed of sound, the integral in equation (3) can be approximated by an integral over a straight line G-202 from element position $\vec{E}$ to focal point $\vec{P}$, or $$T_{inhom} \approx -\frac{1}{c_0} \int_{\vec{E}}^{\vec{P}} n(x,y) ds. \tag{4}$$
$$\text{straight line}$$

The focusing delay error $T_{ab}$, or aberration correction value due to aberrating region G-201, can be defined as:

$$T_{ab} = T_{inhom} - T_{ideal} \approx -\frac{1}{c_0} \int_{\vec{E}}^{\vec{P}} (n(x,y) - 1) ds. \tag{5}$$
$$\text{straight line}$$

These aberration correction values $T_{ab}$ are adaptively estimated at selected measurement depths for each scan line or for a subset of scan lines in an image by the adaptive focusing control system G-100 shown in FIG. 2c.

1. Method

FIGS. 4 and 5 illustrate a real-time adaptive focusing method able to perform adaptive focusing measurement and application concurrently with imaging according to the present invention. FIG. 4 illustrates the steps of the adaptive focus method 600 according to the present invention and its interface with ultrasound beamformer 700. The delineation between method 600 and data interfaces with ultrasound beamformer 700 is shown by the dashed line. Adaptive focus method 600 is divided into local aberration measurement processing 601 consisting of blocks 550–554 and central adaptive focus processing 602 consisting of blocks 555–559. The local aberration measurement processing 601 consists of processing blocks that are preferably performed locally to the receive beamformer system 562 at the location where subarray sum outputs from receive beamformer block 562 are acquired. The central adaptive focus processing 602 consists of processing blocks which are preferably performed centrally with the beamformer control blocks 560 and 561 where scan parameters are provided to blocks 551, 557 and 559 and aberration correction values are output by block 559. The adaptive focus method interfaces with the three components of ultrasound beamformer system 700 in such a manner as to not affect existing real-time imaging operations, but still permit concurrent adaptive focusing operations.

The adaptive focusing method takes as input subarray signals $S_i$ (typically representing a sum of baseband focused receive in-phase/quadrature signals from a plurality of transducer elements $E_k$ in receive beamformer block 562 at subarray i) from partially summed receive beams which are computed by receive beamformer block 562. The adaptive focusing method provides as output aberration correction delays to beamformer control block 560, which uses the correction delays to adjust the focus delay profiles (focusing delays as a function of all elements in the current aperture) of both transmit and receive beamformers of ultrasound beamformer system 700. Ultrasound beamformer system 700, through scan control block 561, provides adaptive focus method 600 with spatial coordinates (indexed as $(S_i, L, R)_m$ for the transmit/receive measurement scan parameters, or as $(E_i, L, R)_c$ for the transmit/receive current scan parameters in FIG. 4).

a. Local Aberration Measurement Processing

Subarray signal $S_i$ input to block 550 is in complex I/Q representation due to the digital processing operations of receive beamformer block 562. In the preferred embodiment, only B-mode imaging scan lines are used for measuring aberration correction values. The aberration measurement processing method accepts B-mode scan lines for measurement, but ignores non-B-mode scan lines from mixed modes containing both B-mode and non-B-mode scan lines. The subarray signals $S_i$ are indexed by subarray number i, measurement scan line number L, and measurement range R, or $(S_i, L, R)_m$.

The grouping of transducer elements into subarrays is illustrated in FIG. 5. The preferred subarray size for this method is a subaperture of four adjacent transducer elements as shown in subarrays 1, 2, and 3, although other subarray configurations are possible, including a subarray having a single transducer element. Using four transducer elements per subarray (1) reduces the computation requirements for real-time adaptive processing; for example, signals are processed at the subarray data rate, which in the preferred case is one-fourth of the element data rate, and (2) provides signal gain against noise because a subarray signal $S_i$, which is a sum of baseband focused receive signals, represents a partial beamformation over a subaperture of the full transducer array.

As shown in FIG. 5, aberration correction values will be computed by correlation and averaging operations within range windows along scan lines, such as 572a and 574a, and within azimuth windows across scan lines, such as 573a and 573b. Range windows are further divided into subrange windows, such as 572a1/572a2 and 574a1/574a2. Block 550 of FIG. 4 allows summation of each subarray's signals for samples within each subrange window prior to the correlation operation to be performed in block 551.

Block 551 of local aberration measurement processing 601 measures range-averaged aberration correction values for scan line $L_m$ by first correlating each sample of a subrange-averaged signal from a subarray $S_i$ within a range window centered at range $R_m$ against at least one of three other values: 1) a subrange-averaged signal from a second and preferably adjacent subarray $S_{i+1}$ corresponding to the same range as the $S_i$ signal, 2) a sum of selected subrange-averaged subarray signals which either includes or excludes the signal from subarray $S_i$, or 3) a stored value in memory. A detailed description of this correlation is provided in section IV.C.2.b. below. Block 552 sums all sample-by-sample correlations within each range window and outputs a single, range-averaged correlation value $C_i$ for each range window centered at range $R_m$. For example, FIG. 5 illustrates a scan frame formed from an array having subarray signals $S_i$. Each scan line can have multiple range windows, such as the two range windows 572 and 574 shown in FIG. 5; the letters a to e have been added on the five left-most scan lines. Each range window corresponds to one of a multitude of N measurement ranges or transmit depths.

The cross correlation is performed for subarray signals $S_i$ at the same range and associated with the same scan line number. In other words, subarray signals $S_i$ are taken from the same location in the imaged subject. Cross correlation block 551 is preferably enabled only for B-mode imaging scan lines.

A range window is nominally centered on the transmit focal point in the preferred embodiment, but other range window locations may also be used. The center of the range window is called the measurement range, or measurement depth. If the transmit beamformer is capable of multiple beam transmission, then compound focal zones on each transmit scan line are possible and the method can apply multiple range windows per scan line, each nominally centered on a transmit focal location, to produce the same multiplicity of averaged cross correlations. After averaging over a range window, the range data rate for averaged cross correlations is significantly reduced from the subarray data rate prior to correlating and averaging.

The cross correlation values $C_i$ which have been accumulated over a range window may be further averaged by block 553, which filters across an azimuth window of multiple scan lines as shown in FIG. 5. Azimuth window size, and therefore the filter length, can be adjusted for scan lines at or near the edge of a scan frame to account for end effects. For example, the left-most scan line in FIG. 5 could use a filter of length 1, the next scan line moving to the right could use a filter of length 3 (this scan line and the one on either side of it), the next one over to the right could use a filter of length 5 (this scan line and the two on either side of it), and so forth. Each accumulated correlation value $C_i$ associated with a range window therefore is multiplied by an azimuth filter coefficient and summed in order to obtain an aberration correction value associated with an image position corresponding to the center of an azimuth averaging window and the center of the range window. For example, the correlation value $C_i$ corresponding to range window 574d would be multiplied by a weight coefficient $W_i$; and summed with the correlation value $C_{i+1}$ corresponding to range window 574e which is multiplied by a weight coefficient $W_{i+1}$; and summed with the correlation value $C_{i+2}$ corresponding to range window 574f which is multiplied by a weight coefficient $W_{i+2}$; and finally summed with the correlation value $C_{i+3}$ corresponding to range window 574g, which is multiplied by a weight coefficient $W_{i+3}$, to obtain an azimuth-averaged aberration correction value for a scan line intersecting the center of azimuth window 573b.

Correlation values $C_i$ output from block 553, which will have a complex (I/Q) representation, are then converted to phase/magnitude ($\phi$/M) representation by processing block 554. Relative to the nominal center frequency (close to or equal to the actual carrier frequency) of the transmitted pulse, the phase represents an estimate of the delay misadjustment for the center frequency from ideal focus caused by an aberrating region in a subject. In the preferred method, the magnitude M may be used as an indicator of the reliability of the phase φ value, with a larger magnitude indicating a higher reliability due to the presence of coherent signal components (noise would ideally produce zero magnitude after range and window averaging the cross correlation). The magnitude M may also be used for gain corrections.

b. Central Adaptive Focus Processing

If the subarray signal $S_i$ measured phase value is considered reliable, it is converted by processing block 555 (based on the transmit pulse nominal center frequency) to a delay $T_i$ associated with each subarray signal $S_i$.

The set of delay values $T_i$ associated with subarray signals $S_i$ that span the actual transducer aperture (or a synthetic aperture) form an aberration delay correction profile at a given measurement depth, forming one profile for each scan line, or a subset of the scan lines, over one scan frame. Further post measurement processing is performed by block 556 to remove any offset or linear slope trend in each profile that would have no effect on focus except to shift the focal point, which is undesirable. Additionally processing across the delay profile is possible, such as fitting a smooth curve through the unsmoothed profile by a polynomial fitting procedure. Each newly acquired aberration delay correction profile may either replace the old delay correction profile curve in delay memory block 558, or be used to update the profile in memory via a weighted summation of the newly acquired profile with the old profile in delay memory block 558. Time delays $T_i$ are stored in delay memory block 558 by three indexing parameters: subarray number, scan line number, and range index. The delays $T_i$ in delay memory block 558 form a measurement grid that sparsely samples the correction data required for each element throughout the image plane (or volume, in the case of 3-D ultrasound imaging).

In order to correct the focusing delay profiles for transmit beamformation, receive beamformation, or both, for any scan mode (not limited to just B-mode), scan geometry, or transmit/receive frequencies, the beamformer control system 561 requests aberration delay correction values for the current transmit focal point location of the transmit beamformer and/or the current receive dynamic focal point location of the receive beamformer indexed by element number, current scan line number, and current range index. A mapping, or look-up rule, to retrieve a profile of aberration correction values selected from the measured values as appropriate for the current location is accomplished by block 557. Interpolation, using block 559, among measured aberration correction values selected from delay memory block 558 may be used to improve the aberration correction value estimate to be output to the delay processor of beamformer control system 560. Although many look-up rules are possible as described above, the preferred mapping rule illustrated by block 557 is claimed and described in co-pending U.S. patent application entitled: METHOD AND APPARATUS FOR A GEOMETRIC ABERRATION TRANSFORM IN AN ADAPTIVE FOCUSING ULTRASOUND BEAMFORMER SYSTEM.

The transmit beamformer and/or receive beamformer aberration correction value profiles generated by block 559 are transferred to the focusing delay processor 560 of the beamformer control system and combined with the profiles generated by 560 to form final transmit focusing delay profiles and/or final receive focusing delay profiles used by the transmit and receive beamformers.

2. Apparatus
a. Adaptive Focusing Control System Interface

Figure 6:
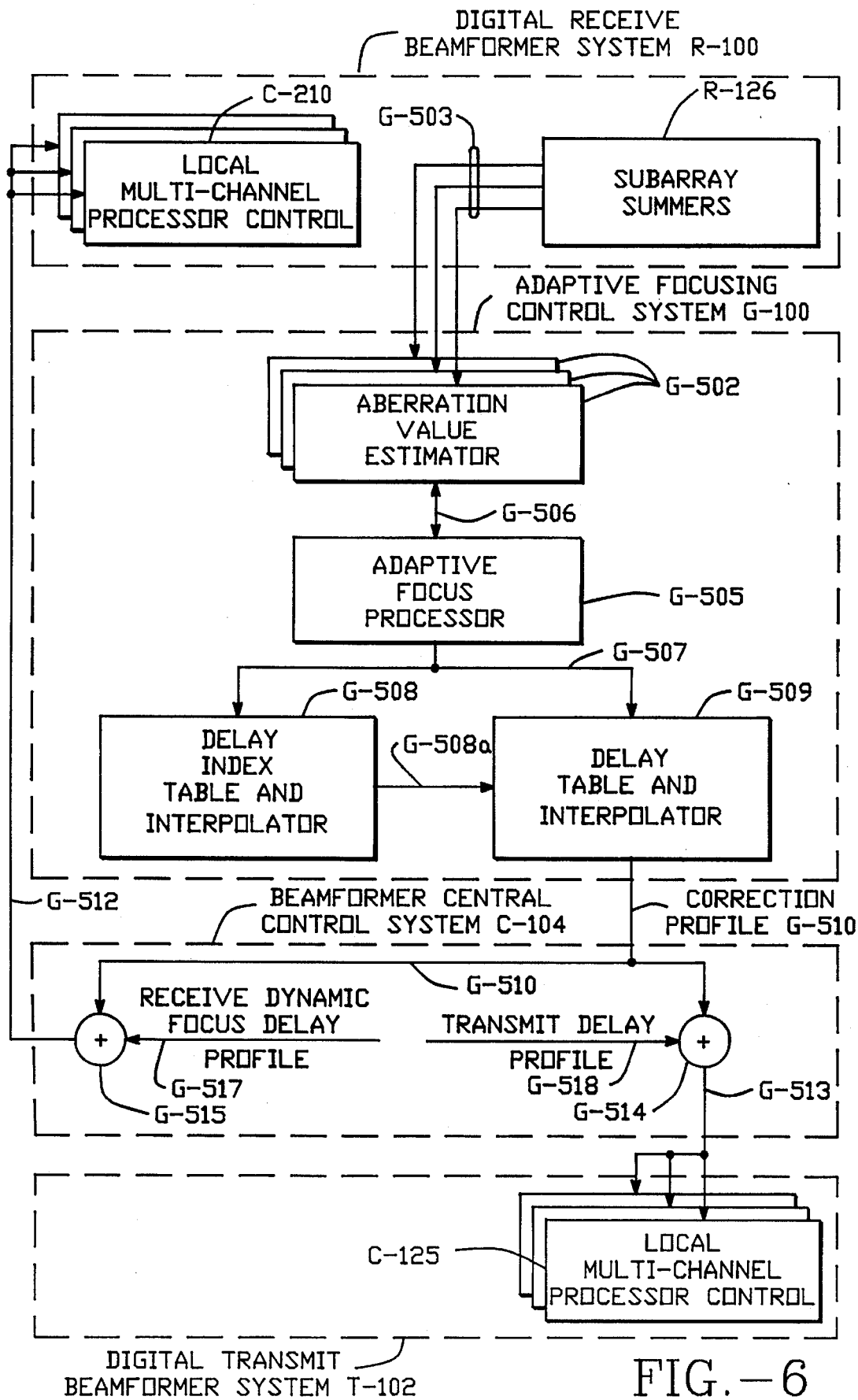
FIG. 6 illustrates an interface between an adaptive focusing control system G-100, digital receive beamformer system R-100, beamformer central control system C-104, and digital transmit beamformer system T-102 according to the present invention.

FIG. 6 illustrates the interface between adaptive focusing control system G-100 and digital receive beamformer system R-100, beamformer central control system C-104 and digital transmit beamformer system T-102 shown in FIG. 2a. Each subarray summer R-126 in baseband multi-beam processor R-125 outputs a subarray signal $S_i$ on one of the data paths G-503 to an aberration value estimator G-502 in adaptive focusing control system G-100. Aberration value estimators G-502 are responsible for measuring aberration correction values. These measured aberration values for respective subarrays are then written across data path G-506 to adaptive focus processor G-505. Adaptive focus processor G-505 then completes additional processing of the measured aberration correction values before writing to delay table and interpolator G-509, preferably organized by subarray, scan line, and range as described by the method of the referenced co-pending patent application entitled: METHOD AND APPARATUS FOR A GEOMETRIC ABERRATION TRANSFORM IN AN ADAPTIVE FOCUSING ULTRASOUND BEAMFORMER SYSTEM. Each transmit or receive beamformation operation initiates delay index table and interpolator G-508, which outputs a scan line index value, preferably generated by the method of the referenced co-pending patent application entitled: METHOD AND APPARATUS FOR A GEOMETRIC ABERRATION TRANSFORM IN AN ADAPTIVE FOCUSING ULTRASOUND BEAMFORMER SYSTEM, on line G-508a to delay table and interpolator G-509. Delay table and interpolator G-509 then outputs a profile of measured or interpolated measurement aberration correction values on line G-510 to beamformer central control system C-104. The receive beamformer aberration correction value profile is then summed, represented by summer G-515, with the receive dynamic focus delay profile on data path G-517, and element delay values from the profile output on data path G-512 to each receiver's local multi-channel processor control C-210 in digital receive beamformer system R-100. The transmit beamformer aberration correction value profile on data path G-510 is summed, through summer G-514, with the transmit focus delay profile on data path G-518, and element delay values from the profile output on data path G-513 to each transmitter's local multi-channel processor control C-125 in digital transmit beamformer system T-102.

Figure 7:
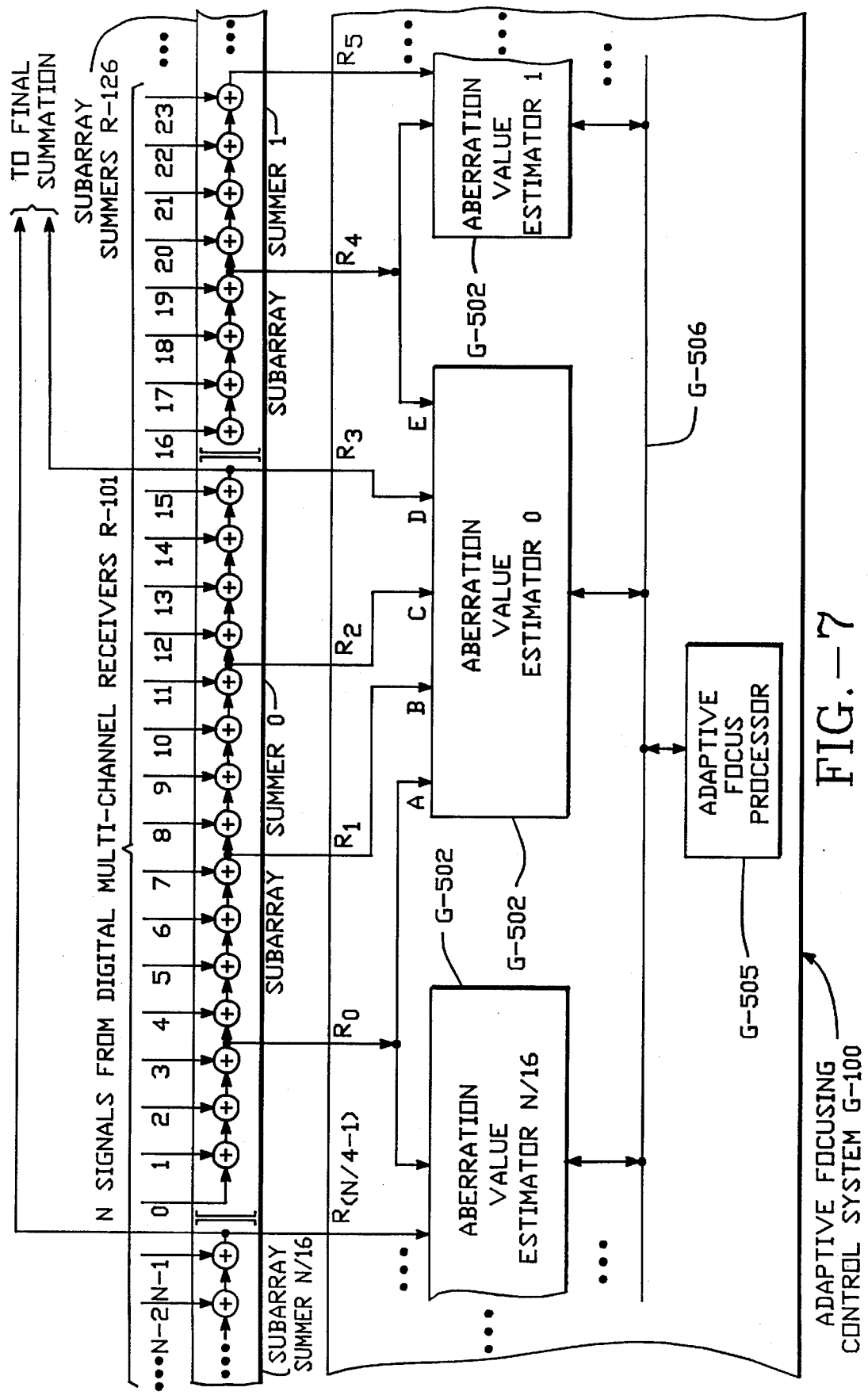
FIG. 7 illustrates a detailed interface between subarray summer R-126, aberration value estimators G-502, and adaptive focus processor G-505 shown in FIGS. 2b–c and 6.

FIG. 7 illustrates the interface between subarray summers R-126 and aberration value estimators G-502. In the preferred embodiment, each subarray summer R-126 will chain sum the signal output of 16 channels from 16 digital multi-channel receivers R-101 with outputs $R_0$ to $R_3$ that tap into the chain sum every four channels. These four outputs, plus the first chain sum output from the adjacent subarray summer, are provided to a single aberration estimator apparatus G-502 capable of performing four cross-correlation operations in parallel. The adaptive focus processor interfaces to each aberration value estimator over data path G-506. Each of the aberration value estimators G-502 receives as inputs five outputs from subarray summers R-126. These sets of five subarray summer outputs overlap so that the last subarray summer output of one aberration value estimator is also the first input of the next aberration value estimator. For an N-channel aperture, subarray output $R_0$ is coupled to both aberration value estimators 0 and N/16. Specifically, a subarray summer output signal $R_0$ consisting of the summed signals on channels 0–3 is passed over data path A to both the first input of aberration value estimator 0 and the last input of aberration value estimator N/16; a subarray summer output signal $R_1$ consisting of summed signals on channels 0-7 is passed over data path B to the second input of aberration value estimator 0; a subarray summer output signal $R_2$ consisting of summed signals on channels 0-11 is passed over data path C to the third input of aberration value estimator 0; a subarray summer output signal $R_3$ consisting of summed signals on channels 0-15 is passed over data path D to the fourth input of aberration value estimator 0; and a subarray summer output signal $R_4$ consisting of summed signals on channels 16-19 is passed over data path E to both the fifth input of aberration value estimator 0 and the first input of aberration value estimator 1. In order to form the preferred subarray signals S that represent sums of only 4 channels, differences between R values will be performed in the aberration value estimator apparatus. For example, to get the subarray sum $S_1$ for channels 4-7, simply compute $S_1=R_1-R_0$.

b. Aberration Value Estimator Processing i. Phase Difference Measurement

As described in the adaptive method above, each aberration value estimator is able to measure phase differences from its five inputs in at least three embodiments. In a correlate-against-neighbor embodiment, an aberration value estimator measures relative phase between adjacent subarray signals. Each subarray signal $S_i$ (sum of baseband focused signals from four adjacent transducer elements), after any programmed sub-range averaging, is multiplied by the complex conjugate of the neighboring sub-range averaged subarray signal $S_{i+1}$ (sum of baseband focused signals from the adjacent set of four transducer elements) in a range window, and the resulting signal is averaged over a range window centered at a measurement depth in an ultrasound scan line. Multiple range-window-averaged correlations can be obtained from multiple range windows at multiple measurement depths in an ultrasound scan line, and each correlation value can be further averaged with correlation values at the same range over multiple ultrasound scan lines in an azimuth window. From each resulting I/Q averaged correlation value, an estimate of the phase difference can be converted (based on receive frequency) into the time delay between the two neighboring subarrays by phase=arctan (Q value/I value).

In a correlate-against-sum embodiment, each subarray signal $S_i$ can be correlated against a sum of subarray signals $S_i$ (summed subarray signal $SUM_k$), and the resulting correlations further processed to also estimate subarray-to-subarray phase differences. The sum of subarrays can include, or not include, $S_i$ itself.

Finally, a correlate-against-memory embodiment may be used in addition to either of the two alternate embodiments listed above. In the correlate-against-memory embodiment, an aberration value estimator calculates phase differences by first correlating a stored waveform (preferably a previous subarray signal $S_i$ or summed subarray signal $SUM_k$) against either the subarray signal $S_i$ or the summed subarray signal $SUM_k$.

The following section describes the correlation and associated phase difference measurements in the three embodiments. In the correlate-against-neighbor embodiment, each of the aberration value estimators G-502 perform the following functions:

ii. Adjacent Subarray Subtraction

As shown in FIG. 7, the subarray sums $R_i$ are not the preferred 4-element subarray signal $S_i$ generated by adding only four adjacent channels. In general, the subarray sum outputs $R_0-R_{N/4-1}$ are given by:

$$R_0 = S_0 \quad (6)$$
$$R_1 = S_0 + S_1$$
$$R_2 = S_0 + S_1 + S_2$$
$$R_3 = S_0 + S_1 + S_2 + S_3$$
$$R_4 = S_4$$
$$\vdots$$

Each aberration value estimator then calculates the desired subarray signals $S_i$ by subtraction of pairs of subarray sums $R_n$ as follows:

$$S_0 = R_0 \quad (7)$$
$$S_1 = R_1 - R_0$$
$$S_2 = R_2 - R_1$$
$$S_3 = R_3 - R_2$$
$$S_4 = R_4$$
$$\vdots$$

iii. Range Accumulation

Each subarray signal $S_i$ is a series of complex in-phase/quadrature (I/Q) range samples gated into the aberration value estimator G-502 by multiple range windows corresponding to measurement depths along an ultrasound scan line. The preferred receive beamformer R-100 is capable of multiple simultaneous beams and, in the preferred embodiment, the subarray sum range samples for each beam processed by multi-channel receiver R-101 are time interleaved, and each aberration value estimator G-502 accepts the time-interleaved multiple beam subarray sums and time interleaves its operations to process the subarray sums from each beam separately. Each of the aberration value estimators G-502 accumulate successive range samples of subarray signal $S_i$ along a scan line, as within each programmed subrange window, such as the subrange window 572a illustrated by dots in FIG. 5 on ultrasound scan line 1.

By first accumulating subarray signals $S_i$ range samples over a subrange, the aberration value estimators not only average against noise effects, they also decimate the downstream data rate by a factor corresponding to the number of samples that are summed, thus reducing the computational rate required for complex multiplications in determining correlation values. The aberration value estimator apparatus is also able to combine multiple simultaneous beams to form a single average beam. Finally, the aberration value estimator apparatus has the flexibility to permit accumulation of subarray signal samples in a manner such that correlation is performed on only one of multiple simultaneous beams, or a composite beam formed by combining a subset of multiple simultaneous beams.

iv. Correlation

The accumulation operations described above produces five types of complex I/Q sample sequences $S'_{ik}$, where i is the subarray number and k the accumulator sample number (for example, accumulator sample number 1 corresponds to subrange window 572a1 at measurement depth 1 in FIG. 5) associated with a range window at a measurement depth. Each of the aberration value estimators G-503 estimates the correlation between two sequences or between a sequence and a sum of sequences by a complex multiply-accumulate operation controlled by a range gate signal which defines the length of a range window.

In the correlate-against-neighbor embodiment, the correlation has the form:

$$C_i = \sum_{\substack{\text{all subrange } k \\ \text{within range gate}}} S'_{ik} S'^*_{(i+1)k} \quad (8)$$

in which * denotes complex conjugation.

In the correlate-against-sum embodiment, the subrange-integrated signal $S'_{ik}$ of a single subarray may be correlated against the sum of subrange-integrated signals from several subarrays. The sum signal is calculated by adding together an arbitrary subset of the five subrange-integrated subarray signals available to each aberration value estimator G-502:

$$\text{SUM}_k = \sum_{i \in \text{sum subset}} S'_{ik} \quad (9)$$

Each subarray signal $S'_{ik}$ may then be correlated against either the summed signal, or the summed signal minus the subarray signal:

$$C_i = \sum_{\substack{\text{all subrange } k \\ \text{within range gate}}} S'_{ik} \text{SUM}^*_k \quad (10)$$

or $$C_i = \sum_{\substack{\text{all subrange } k \\ \text{within range gate}}} S'_{ik} (\text{SUM}_k - S'_{ik})^* \quad (11)$$

In order to obtain a differential phase from the correlations of equations 10 or 11 that is related to the aberration delay correction, a final complex multiplication is required for each correlate-against-sum correlation $C'_i$:

$$C_i = C'_i C'^*_{i+1} \quad (12)$$

The real and imaginary components of the complex I/Q correlation values $C'_i$ shown in equations 10 and 11 are preferably stored as floating point numbers. The correlate-against-memory embodiment can be used in conjunction with either correlate-against-neighbor or correlate-against-sum embodiments. During the current scan line, either $\text{SUM}_k$ or one of the individual subarray subrange-integrated signals $S'_i$ may be correlated against a stored waveform. In the preferred embodiment, the stored waveform is the $\text{SUM}_k$ or $S'_i$ acquired from a previous scan line. For example, the currently computed $\text{SUM}_k$ from the current scan line would be correlated against the previously stored $\text{SUM}_k$, or the currently computed subarray signal $S'_i$ correlated against previously stored subarray signal $S'_i$. The correlate-against-memory embodiment is preferred for synthetic aperture operations in which some receive subarrays overlap between transmit firings used to create the synthetic aperture. In the preferred embodiment, the resulting correlation values $C_i$ from a correlate-against-memory embodiment will not undergo azimuth averaging described in detail below.

v. Azimuthal Scan Line Filtering

Each aberration value estimator produces four correlation values $C_i$ from processing its five input subarray signals for each range window at each measurement depth which are written into the aberration value estimator memory. One of four sets of 16 filter coefficients is used to sum the correlation values $C_i$, selectable from 1 to 16 ultrasound scan lines. The filter coefficient set used may be selected on a scan-line-by-scan-line basis under control of the adaptive focus processor G-505. This allows smooth transitioning of the filter duration near the edges of a scanning frame.

vi. Polar Conversion

After azimuth filtering, a CORDIC algorithm is used to convert complex correlation values $C_i$, which are in quadrature representation (I/Q), into a polar format magnitude and phase representation (M/φ). These values are then placed in an output buffer of each aberration value estimator G-502, and adaptive focus processor G-505 then reads the magnitude and phase values from each aberration value estimator G-502.

c. Local Processing: Aberration Value Estimator Architecture

Figure 8:
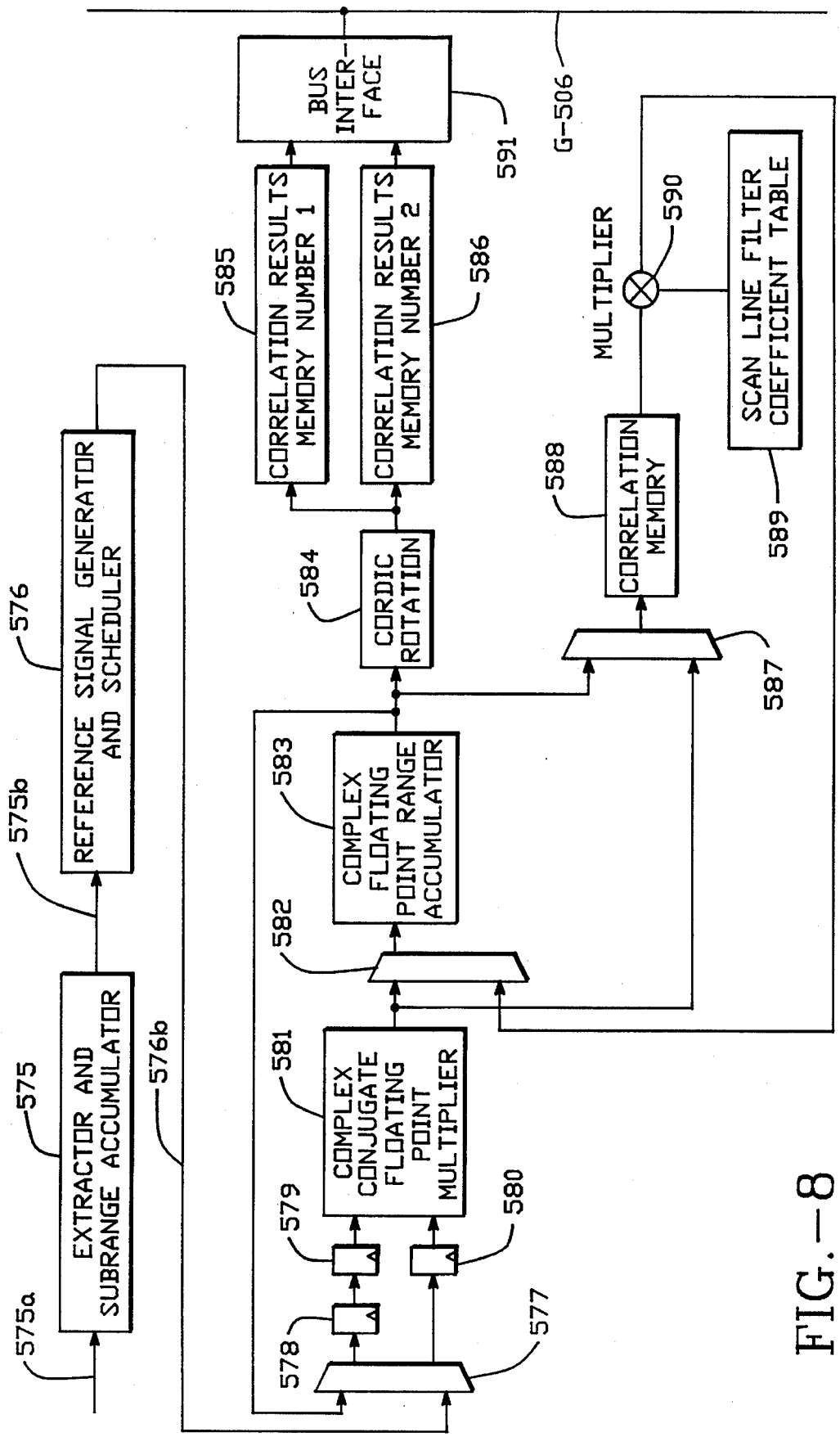
FIG. 8 illustrates an aberration value estimator shown in FIG. 7 with resource sharing according to the present invention.

FIG. 8 provides a block diagram of the aberration value estimator apparatus according to the present invention.

Data path 575a in FIG. 8 represents the five separate data paths A–E from each subarray summer R-126 illustrated in FIG. 7. Typically, there are specific pipeline delays associated with each subarray summer output $R_n$ arriving at an aberration value estimator. Therefore, subarray summer outputs $R_n$ which contain subarray signals $S_i$, as shown in Equation 6, on data path 575a are time aligned by extractor and subrange accumulator 575. After time alignment, extractor and subrange accumulator 575 then extracts, by subtraction of $R_n$ values as necessary, adjacent subarray signals $S_i$, as shown in Equation 7. After time alignment and extraction of the subarray signals $S_i$ from subarray summer outputs $R_n$, extractor and subrange accumulator 575 accumulates samples of subarray signal $S_i$ over each programmed subrange within each range window associated with each ultrasound receive beam. Since subarray signals $S_i$ arriving at each aberration value estimator are interleaved real and imaginary values (I/Q), extractor and subrange accumulator 575 accumulates real sample and imaginary samples of subarray signal $S_i$ separately before outputting the accumulated real and imaginary values on data path 575b.

The subrange accumulated real and imaginary values on data path 575b are written to reference signal generator and scheduler 576. The function of reference signal generator and scheduler 576 is to provide 1) either a reference signal $S'_{(i+1)k}$ or a $\text{SUM}_k$ (shown in Equations 10 and 11) or a signal from sample memory, as required, to correlate against a subarray signal $S'_i$, and 2) schedule the appropriate interleaved sequence of complex operands for complex conjugate floating point multiplier 581 based upon a selected correlation embodiment.

Complex operands are then written to multiplexer 577 which passes the complex operands to registers 579 and 580 to de-interleave them. As the complex conjugate floating point multiplier 581 is performing multiplication on the operands stored in registers 579 and 580, the next arriving operand which is to be correlated is stored in register 578.

Instantaneous correlation values [corresponding to a single product of subrange-integrated signals, either $S'_{ik} \times S'^*_{(i+1)k}$ or $S'_{ik} \times \text{SUM}^*_k$ or $S'_{ik} \times (\text{SUM}_k - S'_{ik})^*$] from complex conjugate floating point multiplier 581 are then passed through multiplexer 582 to complex floating point range accumulator 583. The sequence of instantaneous correlation values within a range window on an ultrasound receive scan line are accumulated to form the $C_i$ represented by Equations 8, 10, or 11.

Correlation values $C_i$ from complex floating point range accumulator 583 will then pass through a windowing operation by way of multiplexer 587 in a correlate-against-neighbor embodiment. The output of multiplexer 587 is then input to correlation memory 588. Each correlation value $C_i$ output from correlation memory 588 is then multiplied by azimuth (scan line) filter coefficients $W_i$ in scan line filter coefficient table 589 by multiplier 590. The set of filter coefficients in scan line filter coefficient table 589 will be selected by control signals (not shown in the Figures) from bus interface 591.

After multiplication, the products from multiplier 590 are supplied to multiplexer 582 for azimuth filter summing by resource sharing the complex floating point range accumulator 583. Complex floating point range accumulator 583 accumulates the filtered correlation values $C_i$, resulting in one value for each range window's measurement depth, as illustrated by range windows 573a and 573b in FIG. 5.

CORDIC rotation 584 will take the floating point output of complex floating point range accumulator 583 and will generate a phase and magnitude representation of the I and Q (real and imaginary) components of the accumulated and filtered correlation $C_i$ values. These results will be placed in correlation results memory number 1.

In a correlate-against-sum embodiment, sampled correlation values $C_i'$ obtained by correlating against a summed or partial summed subarray signal $SUM_k$, as shown in Equations 10 and 11, are fed back to multiplexer 577 from complex floating point range accumulator 583. Correlation values $C_i'$, which are used as a reference, are then multiplied by complex conjugate floating point multiplier 581 as in the correlate-against-neighbor embodiment. Also as in the correlate-against-neighbor embodiment, correlation values $C_i$ are passed to the azimuthal filtering operation. The correlate-against-sum values are then transformed to a magnitude and phase representation (M/φ) by CORDIC rotation 584 and stored in correlation results memory number 1.

In a correlate-against-memory embodiment, a subarray signal $S_i'$ form a previous scan line can be stored in reference signal generator and scheduler 576 and eventually correlated against a current subarray signal $S'_i$. Likewise, a current $SUM_k$ could be correlated against a previous $SUM_k$ stored in reference signal generator and scheduler 576. The correlate-against-memory values $C_i$ output from complex floating point range accumulator 583 would then be converted to magnitude and phase representation (M/φ) by CORDIC rotation 584 and stored in correlation results memory number 2. The correlate-against-memory correlation values $C_i$ are preferably not azimuth filtered or passed through the above described azimuth windowing operation.

Finally, bus interface 591 is used to transfer aberration correction values in correlation memory number 1 and number 2 over data path G-506. Moreover, other stored information in an aberration value estimator is transferred to adaptive focus processor G-505 through bus interface 591. Bus interface 591 is also used by adaptive focus processor G-505 in programming aberration value estimator correlation embodiments or generating multiplexer control signals (programming paths not shown in FIG. 8). The programming of an aberration value estimator also includes selecting the set of filter coefficients in scan line filter coefficient table 589 used for azimuthal filtering.

FIG. 9 illustrates a detailed description of extractor and subrange accumulator 575 and reference signal generator and scheduler 576 as shown in FIG. 8. Extractor and subrange accumulator 575 is partitioned into two separate functional blocks defined by dashed lines: 1) an extractor block and 2) a subrange accumulator block. Subarray sums $R_0$–$R_4$ are placed on data paths A–E, respectively, to the extractor block and, in particular, time aligner 575c. Time aligner 575c synchronously time aligns the subarray sums $R_0$–$R_4$ by removing differential pipeline delays. Subarray sums $R_0$–$R_4$ are then input to summer 575d, 575e and 575f in order to perform the subtraction of subarray sums $R_n$ illustrated in Equation 7 above to obtain subarray signals $S_0$–$S_4$.

Subarray signals $S_0$–$S_4$ are then input to multipliers 575g, 575h, 575i, 575j and 575k, respectively. These multipliers act as gates in allowing interleaved multi-beam subarray signals $S_i$ to be accumulated during subrange windows programmed for each beam. These multipliers multiply the subarray signals $S_i$ by either 0 or 1 during at least two ultrasound system modes. If the ultrasound system is operating in a multiple beam mode, interleaved subarray sum signal $S_i$ samples must be selectively gated in an interleaved manner before accumulating over a subrange window and storing in the subrange accumulator registers 575v–z. For example, in a two-beam ultrasound system mode, subarray sum signal $S_i$ samples for beam 0 and beam 1 would be interleaved on data paths A–E. If beam 0 is processed, the subarray signals $S_i$ associated with beam 1 is removed by multiplying the subarray sum signal $S_i$ for beam 1 by 0 at multipliers 575g–h.

In a second ultrasound system mode, multipliers 575g–k are used for synthetic line operation as described and claimed in the referenced co-pending patent application entitled: METHOD AND APPARATUS FOR COHERENT IMAGE FORMATION. If two beams, for example, are being processed, the interleaved subarray sum signal $S_i$ samples associated with each beam should be added in the accumulator. Multipliers 575g–k allow subarray signal $S_i$ samples associated with both beam 0 and beam 1 to be passed to summers 575q–u. The control signals determining the selection of one beam or combinations of beams through multipliers 575g–k are provided through bus interface 591 in FIG. 8. Adaptive focus processor G-505 communicates ultrasound system modes over data path 506 to bus interface 591, which generates the appropriate control signals for the aberration value estimator computational components.

The output of multipliers 575g–k are then input to summers 575q–575u, respectively. Each of these summers 575q–u is coupled to respective registers 575v–z and multiplexers 575l-p in order to sum subarray signal $S_i$ samples from multipliers 575g–k, respectively, over a subrange window. The control for multiplexers 575l-p is also generated by bus interface 591. These multiplexers determine the accumulation of subarray signals $S_i$ in registers 575v–z or, in other words, the length of a subrange window. The final summations are stored in registers 575aa–ae to hold while a new subrange summation is started.

Subrange-integrated subarray signals $S'_0$–$S'_4$ produced by 575 are then passed to reference signal generator and scheduler 576. Reference signal generator and scheduler 576 is partitioned into two separate functional blocks as delineated by the two dashed blocks in FIG. 9. Subrange-integrated subarray signals $S'_0$–$S'_4$ are input by data path 575b to multiplexer 576a and multiplexer 576m in the reference signal generator block and registers 576i in the scheduler block. The function of reference signal generator and scheduler 576 is to generate $SUM_k$ or $(SUM_k-S'_{ik})$ of Equations 10 and 11 above. Depending upon which correlation embodiment is selected, subrange-integrated subarray signals $S'_0$–$S'_4$ will be passed to either 1) the upper portion of the reference signal generator block (multiplexer 576a), 2) registers 576i in the scheduler block, or 3) the lower portion of reference signal generator (multiplexer 576m).

In a correlate-against-neighbor embodiment, subrange-integrated subarray signals $S'_0$–$S'_4$ are passed to registers 576i. Selected subrange-integrated subarray signals $S'_i$ are passed through multiplexer 576h to multiplier 576k and eventually to data path 576b. Selected subarray signals $S'_i$ are summed with 0 from multiplexer 576r by summer 576l. For example, if subarray signal $S'_0$ and subarray signal $S'_1$ are to be correlated, multiplexer 576h would allow registers storing subarray signals $S'_0$ and $S'_1$ to interleave, sampleby-sample, the subarray signals S'$_0$ and S'$_1$ to data path 576b after multiplication by 1 from multiplier 576k and summing of 0 by summer 576l.

In a correlate-against-sum embodiment, the lower data path of reference signal generator and scheduler 576 is utilized. Subarray signals S'$_0$–S'$_4$ are summed by summer 576o, with the contents placed into register 576p in order to generate SUM$_k$ of Equation 10 above. SUM$_k$ is then placed in register 576q and passed to summer 576l by multiplexer 576r. If a partial SUM$_k$, as in Equation 11 above, is required, −1 is applied by multiplier 576k to a subarray signal S'$_i$ from registers 576i selected by multiplexer 576h. Subarray signal S$_i$ is thus subtracted from SUM$_k$ by multiplexer 576r at summer 576l to place a subarray partial sum signal (SUM$_k$–S'$_i$) on data path 576b. By controlling multiplexers 576r and 576h, the scheduler interleaves, sample-by-sample, S$_i$ and SUM$_k$, or S'$_i$ and (SUM$_k$–S'$_i$), as appropriate to data path 576b.

Finally, the upper portion of reference signal generator and scheduler 576 is used for the correlate-against-memory embodiment. Multiplexer 576a selects the subarray signals S'$_0$–S'$_4$ to be entered into summer 576c. Multiplexer 576s, summer 576c and register 576d allow S'$_i$ or SUM$_k$ to be written to register 576d and eventually to sample memory 576e and register 576g. A previously stored SUM$_k$ can then be written to register 576f while a currently computed SUM$_k$ can be accumulated by summer 576c, register 576d and multiplexer 576s and written to sample memory 576e and register 576g. The previously stored SUM$_k$ and currently computed SUM$_k$ then are passed by multiplexer 576h to data path 576b, similarly interleaved sample-by-sample.

Likewise, if a currently computed subarray signal S'$_i$ is to be multiplied by a previously stored subarray signal S'$_i$, the previously stored subarray signal S'$_i$ would be written to sample memory 576e and then to register 576f while a currently computed subarray S'$_i$ would be written from register 576d to register 576g.

Finally, one of ordinary skill in the art can appreciate the flexibility the present aberration value estimator provides in correlation. Thus, numerous embodiments, other than those listed above, can be accomplished using the present aberration value estimator apparatus.

d. Central Processing: Adaptive Focus Processor i. Aberration Correction Value Profile Generation by Adaptive Focus Processor Adaptive focus processor G-505 performs at least the following computational functions:

1. Reads the aberration correction values calculated by aberration value estimators G-502.

2. Converts aberration correction values reported by the aberration value estimators and accumulates it after conversion to delay values with the previously estimated delay to establish the total aberration delay for those subarrays for which data is available.

3. Removes offset and linear trend components of the total delay profile (delay versus element position). These components if not removed would only shift the focus position (a steering error) and would have no effect on the quality of the focus. For example, if aberrations introduce a steering error, but maintain good focus, an adaptive focusing system cannot detect this shift in position.

4. Fit a second degree or higher polynomial model to the aberration correction profile after step 3

$$T_k = \sum_{i=2}^{N} a_i P_{ik} + T_k^{res} \tag{13}$$

where N is the programmed polynomial order, $a_i$ is the polynomial weighting coefficient, $P_{ik}$ is the selected polynomial of order i at element index k, $T_k$ is the measured aberration correction value (with constant and linear terms removed) at element index k, and $T_k^{res}$ is the aberration correction residual value after the polynomial fitting. Different polynomial types and means of fitting may be programmed.

5. Arbitrarily weight the polynomial coefficients and aberration correction residual value and recombine to form a smoothed aberration correction value:

$$\hat{T}_k = \sum_{i=2}^{N} w_i a_i P_{ik} + w_{res} T_k^{res} \tag{14}$$

where $w_i$ and $w_{res}$ are the weights to be applied to the polynomials and the aberration correction residual value, respectively. In the preferred embodiment, the polynomial is Legendre and the weights $w_i$ of the Legendre polynomials are constrained such that $w_{res} \leq w_i \leq 1$.

6. Add the new aberration correction estimate $\hat{T}_k$ to the previous stored correction, remove any linear trend or offset component that may be present due to round-off error, and store the updated aberration correction profile to delay table and interpolator G-509.

Adaptive focus processor G-505 is also a controller, tracking associations of transducer elements with subarrays, including situations in which subarray results are to be ignored during various modes. This is particularly important when the ultrasound imaging system is in either a synthetic aperture or a sliding aperture mode. The sliding aperture operation is further detailed in U.S. Pat. No. 4,699,009 by inventors S. H. Maslak and H. G. Larsen entitled DYNAMICALLY FOCUSED LINEAR PHASED ARRAY ACOUSTIC IMAGING SYSTEM, issued to Acuson on Oct. 13, 1987.

Consider a synthetic aperture mode involving two apertures to be acquired from two separate transmit firings. Adaptive focus processor G-505 will be required to combine the results of two different sets of readings from the aberration value estimators G-502. One set of readings will correspond to the initial receive aperture from one transmit firing, and the other set of readings will correspond to the receive aperture of the other aperture half of the synthetic aperture. Adaptive focus processor G-505 and aberration value estimators will be responsible for determining any relative delay value between the two receive apertures.

Adaptive focus processor G-505 supports real-time adaptive update rates such that all operations described as central adaptive focus processing 602 in FIG. 4 can be performed at computational rates that permit current transmit and/or receive scan lines to be able to use aberration correction data from nearby recently acquired and processed scan lines during the same scan frame. The preferred embodiment uses dedicated local aberration value estimators and a preferred look-up rule for block 557 of FIG. 4 to off-load some of the highest computational requirements in order that the central adaptive focus processor computational load is able to satisfy the desired real-time update performance.

D. Conclusion

Therefore, an ultrasound system having real-time, concurrent adaptive focusing and imaging without an adaptive mode is disclosed. Aberration correction values corresponding to an aberration region are measured at a scan line rate using B-mode ultrasound scan lines. The aberration correction values are then used to dynamically correct sequel scan lines during transmit and receive beamformation. The aberration correction values may be used to correct both B-mode and non-B-mode formats, other scan geometries, or other imaging frequencies. Finally, an aberration value estimator measures aberration correction values in various ultrasound embodiments including multiple beam transmit and receive, synthetic aperture, sliding aperture, synthetic scan lines and adjustable frequency per scan line without using a special "adaptive" mode, and an adaptive focus processor applies the focus correction delays during transmit and receive beamformation.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

VI. CLAIMS

What is claimed is:

1. In an ultrasound imaging system comprising a plurality of transducer elements; a transmitter providing a plurality of first signals to a respective transmit plurality of the transducer elements based upon respective transmit delay values to form first ultrasonic beams directed to a subject; a receiver acquiring second signals associated with the first beams from a respective receive plurality of the transducer elements and delaying the second signals by respective receive delay values to form delayed second signals; and a summer responsive to the delayed second signals to form second beam signals used to form an image, the improvement comprising:

a sub-array signal generator forming a plurality of sub-array signals, each responsive to a respective plurality of the delayed second signals;

a plurality of aberration correction value estimators, each responsive to at least a respective first sub-array signal to generate at least one aberration correction value; and an adaptive focus processor modifying at least some of the delay values in response to the aberration correction values to improve the image;

said generator forming said plurality of sub-array signals, said estimators forming said aberration correction values, and said adaptive focus processor modifying said delay values concurrently with said summer forming said second beam signals.

2. The imaging system of claim 1 wherein each aberration correction value estimator comprises means for forming at least one respective correlation value by cross-correlating the respective first sub-array signal and a respective reference signal while maintaining a constant relative delay therebetween, and means for forming at least one aberration correction value responsive to the at least one correlation value.

3. The imaging system of claim 2 wherein each reference signal is responsive to the sub-array signals.

4. The imaging system of claim 2 wherein the reference signal for each estimator corresponds to another one of the sub-array signals.

5. The imaging system of claim 4 wherein said first sub-array signal and said another one of the sub-array signals for each of the aberration correction value estimators correspond to adjacent groups of the transducer elements.

6. The imaging system of claim 2 wherein each reference signal is responsive to a respective summed signal formed by summing a subset of the sub-array signals.

7. The imaging system of claim 2 wherein each reference signal is responsive to a respective stored value.

8. The imaging system of claim 1 wherein the adaptive focus processor comprises:

means for storing a first plurality of aberration correction values, each aberration correction value corresponding to a respective one of a plurality of sub-array signals and a respective one of a plurality of first locations in said subject; and means for selecting for a second location in said subject a second plurality of aberration correction values from the first plurality of aberration correction values, wherein at least two of the selected aberration correction values correspond to distinct first locations.

9. The imaging system of claim 8 wherein the first location is in a range about a focal point.

10. In an ultrasound imaging system comprising a plurality of transducer elements; a transmitter providing a plurality of first signals to a respective transmit plurality of the transducer elements based upon respective transmit delay values to form first ultrasonic beams directed to a subject; a receiver acquiring second signals associated with the first beams from a respective receive plurality of the transducer elements and delaying the second signals by respective receive delay values to form delayed second signals; and a summer responsive to the delayed second signals to form second beam signals used to form an image, the improvement comprising:

a sub-array signal generator forming a plurality of sub-array signals, each responsive to a respective plurality of the delayed second signals;

a plurality of aberration correction value-estimators, each responsive to at least one respective sub-array signal and a respective reference signal responsive to the sub-array signals, each estimator forming (1) at least one respective correlation value by cross-correlating the respective first sub-array signal and the respective reference signal while maintaining a constant relative delay therebetween, and (2) at least one aberration correction value responsive to the at least one correlation value; and an adaptive focus processor modifying at least some of the delay values in response to the aberration correction values to improve the image;

said image updated by the imaging system once per frame, said estimators forming said aberration correction values and said adaptive focus processor modifying said delay values more than once per frame.

11. In an ultrasound imaging system comprising a plurality of transducer elements; a transmitter providing a plurality of finest signals to a respective transmit plurality of the transducer elements based upon respective transmit delay values to form first ultrasonic beams directed to a subject; a receiver acquiring second signals associated with the first beams from a respective receive plurality of the transducer elements and delaying the second signals by respective receive delay values to form delayed second signals; and a summer responsive to the delayed second signals to form scan line signals used to form an image, the improvement comprising:

a sub-array signal generator forming a plurality of sub-array signals, each responsive to a respective plurality of the delayed second signals;

a plurality of aberration correction value estimators, each responsive to at least a respective sub-array signal and operative to form at least one aberration correction value; and an adaptive focus processor modifying at least some of the delay values in response to the aberration correction values to improve the image;

said generator forming said plurality of sub-array signals, said estimators forming said aberration correction values, and said adaptive focus processor modifying said delay values concurrently with said summer forming said scan line signals;

said adaptive focus processor modifying said delay values for forming a current scan line signal using aberration correction values from recently acquired scan line signals, wherein said current scan line signal and said recently acquired scan line signals are acquired within a single scan frame.

12. In an ultrasound imaging system comprising a plurality of transducer elements; a transmitter providing a plurality of first signals to a respective transmit plurality of the transducer elements based upon respective transmit delay values to form first ultrasonic beams directed to a subject; a receiver acquiring second signals associated with the first beams from a respective receive plurality of the transducer elements and delaying the second signals by respective receive delay values to form delayed second signals; and a summer responsive to the delayed second signals to form second beam signals used to form an image, the improvement comprising:

a plurality of aberration correction value estimators, each responsive to at least one respective delayed second signal and a respective reference signal, each estimator forming (1) at least one respective correlation value by cross-correlating said delayed second signal and said reference signal while maintaining a constant relative delay therebetween, and (2) at least one aberration correction value responsive to the at least one correlation value; and an adaptive focus processor modifying at least some of the delay values in response to the aberration correction values to improve the image;

said estimators forming said aberration correction values and said adaptive focus processor modifying said delay values independently of operator intervention and concurrently with said summer forming said second beam signals.

13. In an ultrasound imaging system comprising a plurality of transducer elements; a transmitter providing a plurality of first signals to a respective transmit plurality of the transducer elements based upon respective transmit delay values to form first ultrasonic beams directed to a subject; a receiver acquiring second signals associated with the first beams from a respective receive plurality of the transducer elements and delaying the second signals by respective receive delay values to form delayed second signals; and a summer responsive to the delayed second signals to form second beam signals used to form an image, the improvement comprising:

a plurality of aberration correction value estimators, each responsive to at least one respective delayed second signal, each estimator forming first aberration correction values indicative of amplitude aberrations and second aberration correction values indicative of delay aberrations associated with respective aberrating regions; and an adaptive focus processor modifying at least some of the delay values in response to the second aberration correction values to improve the image.

14. In an ultrasound imaging system comprising a plurality of transducer elements; a transmitter providing a plurality of first signals to a respective transmit plurality of the transducer elements based upon respective transmit delay values to form first ultrasonic beams directed to a subject; a receiver acquiring second signals associated with the first beams from a respective receive plurality of the transducer elements and delaying the second signals by respective receive delay values to form delayed second signals; and a summer responsive to the delayed second signals to form second beam signals used to form an image, the improvement comprising:

a plurality of aberration correction value estimators, each responsive to at least one delayed second signal and generating at least one respective aberration correction value; and an adaptive focus processor modifying at least some of the delay values in response to the aberration correction values to improve the image;

wherein the aberration correction value estimators respond to delayed second signals for a first image, wherein the adaptive focus processor modifies delay values for a second image, and wherein the first and second images differ in at least one of imaging mode and scan geometry.

15. In an ultrasound imaging system comprising a plurality of transducer elements; a transmitter providing a plurality of first signals to a respective transmit plurality of the transducer elements based upon respective transmit delay values to form first ultrasonic beams directed to a subject; a receiver acquiring second signals associated with the first beams from a respective receive plurality of the transducer elements and delaying the second signals by respective receive delay values to form delayed second signals; and a summer responsive to the delayed second signals to form second beam signals used to form an image, the improvement comprising:

a plurality of aberration correction value estimators, each responsive to at least one delayed second signal and generating at least one respective aberration correction value; and an adaptive focus processor modifying at least some of the delay values in response to the aberration correction values to improve the image;

wherein the first beams comprise multiple simultaneously generated transmit beams.

16. In an ultrasound imaging system comprising a plurality of transducer elements; a transmitter providing a plurality of first signals to a respective transmit plurality of the transducer elements based upon respective transmit delay values to form first ultrasonic beams directed to a subject; a receiver acquiring second signals associated with the first beams from a respective receive plurality of the transducer elements and delaying the second signals by respective receive delay values to form delayed second signals; and a summer responsive to the delayed second signals to form second beam signals used to form an image, the improvement comprising:

a plurality of aberration correction value estimators, each responsive to at least one delayed second signal and generating at least one respective aberration correction value; and an adaptive focus processor modifying at least some of the delay values in response to the aberration correction values to improve the image;

wherein the second beam signals comprise multiple simultaneously formed receive beams.

17. In an ultrasound imaging system comprising a plurality of transducer elements; a transmitter providing a plurality of first signals to a respective transmit plurality of the transducer elements based upon respective transmit delay values to form first ultrasonic beams directed to a subject; a receiver acquiring second signals associated with the first beams from a respective receive plurality of the transducer elements and delaying the second signals by respective receive delay values to form delayed second signals; and a summer responsive to the delayed second signals to form second beam signals used to form an image, the improvement comprising:

a plurality of aberration correction value estimators, each responsive to at least one delayed second signal and generating at least one respective aberration correction value; and an adaptive focus processor modifying at least some of the delay values in response to the aberration correction values to improve the image;

wherein the estimators and the adaptive focus processor operate while the transmitter and the receiver operate inn a synthetic aperture mode.

18. The imaging system of claim 13 wherein said first signals are further responsive to transmit amplitude values and said second signals are further responsive to receive amplitude values, and said adaptive focus processor further modifies at least some of the amplitude values in response to the first aberration correction values to improve the image.

19. The ultrasound imaging system of claims 1 or 14, wherein the estimators and the adaptive focus processor operate while the transmission and the receiver operate in a sliding aperature mode.

20. The imaging system of claim 1 or 14 wherein the aberration correction value estimators form the aberration correction values by updating previously-determined aberration correction values.

21. The imaging system of claim 1 or 14 wherein the aberration correction value estimators form aberration correction values while the imaging system operates in an imaging mode selected from the group consisting of B-mode, color Doppler mode, M-mode and combinations thereof.

22. The imaging system of claim 1 or 14 wherein the aberration correction value estimators form aberration correction values while the imaging system operates in an imaging format selected from the group consisting of sector, Vector®, linear, curved linear, steered linear, steered curved linear, and curved Vector®.

23. The imaging system of claim 1 or 14 wherein the aberration correction value estimators form aberration correction values responsive to first ultrasonic beams at a first frequency and the adaptive focus processor modifies the delay values for a second frequency.

24. The imaging system of claim 1, 10 or 11 wherein the sub-array signal generator comprises:

means for generating a plurality of sub-array signals associated with a plurality of depth locations along a scan line; and means for averaging the plurality of sub-array signals to obtain an averaged sub-array signal.

25. The imaging system of claim 24 wherein the sub-array signals associated with a plurality of depth locations are obtained from a selectable window along the scan line.

26. The imaging system of claim 25 wherein the window comprises a first subwindow and a second subwindow, and wherein the averaging means combines a first averaged sub-array signal associated with the first subwindow with a second averaged sub-array signal associated with the second subwindow to obtain the averaged sub-array signal.

27. The imaging system of claim 1 or 14 wherein the aberration correction value estimators comprise:

means for generating a plurality of correlation values associated with a plurality of depth locations along a scan line; and means for averaging the plurality of correlation values to obtain an averaged correlation value.

28. The imaging system of claim 27 wherein the plurality of correlation values is obtained from a selectable window along the scan line.

29. The imaging system of claim 28 wherein the window comprises a first subwindow and a second subwindow, and wherein the averaging means comprises means for combining a first averaged correlation value associated with the first subwindow with a second averaged correlation value associated with the second subwindow to obtain the averaged correlation value.

30. The imaging system of claim 1 or 14 wherein the aberration correction value estimators comprise means for converting the correlation value into phase and magnitude values.

31. The imaging system of claim 30 further comprising means for using the magnitude value as a quality indicator.

32. The imaging system of claim 30 wherein the aberration correction value estimators comprise means for converting the phase value into an aberration correction delay value.

33. The imaging system of claim 1 or 14 wherein each aberration correction value estimator comprises:

means for multiplying a plurality of correlation values associated with a plurality of scan lines with a plurality of respective weight values to form a summed correlation value.

34. The imaging system of claim 1 or 10 or 12 or 13 wherein the adaptive focus processor comprises means for removing trend values from the aberration correction values.

35. The imaging system of claim 1 or 10 or 12 or 13 wherein the adaptive focus processor comprises means for interpolating a first aberration correction value associated with a first sub-array group and a second aberration correction value associated with a second sub-array group to obtain an aberration correction value associated with a transducer element.

36. The imaging system of claim 1 or 10 or 12 or 13 wherein the adaptive focus processor comprises means for filtering the modified delay values.

37. The imaging system of claim 1 or 14 or 15 or 16 wherein the aberration correction value estimators form the correlation values and the adaptive focus processor modifies the delay values while the transmitter forms the first ultrasonic beams from the group consisting of compound focus transmit beams and sequential focus transmit beams.

38. The imaging system of claim 1 or 14 wherein the delay values apply to the entire image.

39. The imaging system of claim 1 or 14 wherein the adaptive focus processor comprises means for supplying the modified delay values to a single delay apparatus included in one of the transmitter and the receiver.

40. The imaging system of claim 1 or 14 wherein the aberration correction value estimators operate while the transmitter and receiver operate in a synthetic aperture mode.

41. The imaging system of claim 1 or 14 wherein the aberration correction value estimators operate while the transmitter and receiver operate in a sliding aperture mode.

42. The imaging system of claim 1 or 14 wherein the aberration correction value estimators generate aberration correction values and the adaptive focus processor modifies delay values while the second beam signals comprise multiple simultaneously received receive beams.

43. The imaging system of claim 1 or 14 wherein the aberration correction value estimators generate aberration correction values and the adaptive focus processor modifies delay values while the first ultrasonic beams comprise multiple simultaneously generated transmit beams.

44. The imaging system of claim 1 or 14 wherein the aberration correction value estimators generate aberration correction values and the adaptive focus processor modifies delay values while the receiver operates to form synthetic scan lines.

45. The imaging system of claim 14 wherein the first image is a B-mode image and the second image is a color Doppler mode image.

46. The imaging system of claim 14 wherein the aberration correction value estimators form aberration correction values while the imaging system operates in B-mode and the adaptive focus processor modifies delays while the imaging system operates in an imaging mode selected from the group consisting of B-mode, color Doppler mode, M-mode and combinations thereof.

47. The imaging system of claim 14 wherein the aberration correction value estimators form aberration correction values while the imaging system operates in an imaging format selected from the group consisting of sector, Vector®, linear, curved linear, steered linear, steered curved linear, and curved Vector®, and wherein the adaptive focus processor modifies delays while the imaging system operates in a different image format selected from the same group.

\* \* \* \* \*

UNITED STATES PATENT AND TRADEMARK OFFICE
CERTIFICATE OF CORRECTION

PATENT NO. : 5,570,691
DATED : November 5, 1996
INVENTOR(S) : Wright et al.

Page 1 of 2

It is certified that error appears in the above-indentified patent and that said Letters Patent is hereby corrected as shown below:

In the Title Page

Column 2, line 1, under "OTHER PUBLICATIONS", delete "Iwosing" and substitute with --Imaging--.

Column 2, line 9, under "OTHER PUBLICATIONS", after "of" insert --the--.

On page 2, column 1, line 9, under "U.S. PATENT DOCUMENTS", delete "73/547" and substitute --73/597--.

In column 26, line 35, please delete "5751-p" and substitute therefor --575 $l$-$p$--.

In column 26, line 37, please delete "5751-p" and substitute therefor --575 $l$-$p$--.

In column 30, line 58, delete "finest" and substitute therefore --first--.

In column 31, line 20, delete "are acquired" and substitute therefor --occur--.

UNITED STATES PATENT AND TRADEMARK OFFICE
CERTIFICATE OF CORRECTION

PATENT NO. : 5,570,691
DATED : November 5, 1996
INVENTOR(S) : Wright et al.

It is certified that error appears in the above-indentified patent and that said Letters Patent is hereby corrected as shown below:

In column 33, line 29, delete "inn" and substitute therefor --in--.

In column 33, line 38, delete "transmission" and substitute therefor --transmitter--.

Signed and Sealed this

Nineteenth Day of May, 1998

Attest:

BRUCE LEHMAN

*Attesting Officer*     *Commissioner of Patents and Trademarks*